United States Patent
Clayton et al.

(10) Patent No.: US 10,866,698 B2
(45) Date of Patent: *Dec. 15, 2020

(54) SOCIAL PLAYBACK QUEUES

(71) Applicant: Sonos, Inc., Santa Barbara, CA (US)

(72) Inventors: Eric Clayton, Cambridge, MA (US); Danny Valente, Dracut, MA (US)

(73) Assignee: Sonos, Inc., Santa Barbara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/188,186

(22) Filed: Nov. 12, 2018

(65) Prior Publication Data

US 2019/0079645 A1   Mar. 14, 2019

Related U.S. Application Data

(63) Continuation of application No. 14/821,513, filed on Aug. 7, 2015, now Pat. No. 10,126,916, which is a
(Continued)

(51) Int. Cl.
*G06F 3/0482* (2013.01)
*G06F 3/16* (2006.01)
(Continued)

(52) U.S. Cl.
CPC .......... *G06F 3/0482* (2013.01); *G05B 15/02* (2013.01); *G06F 3/04842* (2013.01);
(Continued)

(58) Field of Classification Search
CPC ...... G06F 3/0482; G06F 16/48; G06F 16/438; G06F 16/60; G06F 16/683; G06F 16/68; G06F 16/686; G06F 16/639; G06F 3/04842; G06F 3/165; G05B 15/02; H04L 12/2812; H04L 51/32; H04L 65/4084; H04L 65/60;
(Continued)

(56) References Cited

U.S. PATENT DOCUMENTS 4,296,278 A   10/1981   Cullison et al.
4,816,989 A   3/1989   Finn et al.
(Continued)

FOREIGN PATENT DOCUMENTS

CN   101410773 A   4/2009
CN   101714156 A   5/2010
(Continued)

OTHER PUBLICATIONS

Preinterview First Office Action dated May 5, 2016, issued in connection with U.S. Appl. No. 14/495,595, filed Sep. 24, 2014, 6 pages.
(Continued)

*Primary Examiner* — Fan S Tsang
*Assistant Examiner* — David Siegel

(57) ABSTRACT

An example method involves monitoring, by a computing device, a communications feed for an indication of media and detecting, in the communications feed, the indication of the media. The method may further involve identifying at least one media item corresponding to the indication of the media and causing a playback queue of a media playback system to include one or more of the identified at least one media item.

20 Claims, 10 Drawing Sheets

Related U.S. Application Data continuation of application No. 14/455,651, filed on Aug. 8, 2014, now Pat. No. 9,874,997.

(51) Int. Cl.
| | |
|---|---|
| *G05B 15/02* | (2006.01) |
| *G06F 16/48* | (2019.01) |
| *H04L 29/06* | (2006.01) |
| *H04L 12/28* | (2006.01) |
| *H04N 21/24* | (2011.01) |
| *H04N 21/262* | (2011.01) |
| *H04N 21/4788* | (2011.01) |
| *H04L 12/58* | (2006.01) |
| *G06F 3/0484* | (2013.01) |
| *H04L 29/08* | (2006.01) |

(52) U.S. Cl.
CPC .............. *G06F 3/165* (2013.01); *G06F 16/48* (2019.01); *H04L 12/2812* (2013.01); *H04L 51/32* (2013.01); *H04L 65/4084* (2013.01); *H04L 65/60* (2013.01); *H04L 67/10* (2013.01); *H04N 21/2408* (2013.01); *H04N 21/26258* (2013.01); *H04N 21/4788* (2013.01); *H04L 2012/2849* (2013.01)

(58) Field of Classification Search
CPC ............ H04L 67/10; H04L 2012/2849; H04N 21/2408; H04N 21/26258; H04N 21/4788
See application file for complete search history.

(56) References Cited

U.S. PATENT DOCUMENTS

| | | |
|---|---|---|
| 5,182,552 A | 1/1993 | Paynting |
| 5,239,458 A | 8/1993 | Suzuki |
| 5,299,266 A | 3/1994 | Lumsden |
| 5,406,634 A | 4/1995 | Anderson et al. |
| 5,440,644 A | 8/1995 | Farinelli et al. |
| 5,467,342 A | 11/1995 | Logston et al. |
| 5,491,839 A | 2/1996 | Schotz |
| 5,553,222 A | 9/1996 | Milne et al. |
| 5,563,946 A | 10/1996 | Cooper et al. |
| 5,668,884 A | 9/1997 | Clair, Jr. et al. |
| 5,673,323 A | 9/1997 | Schotz et al. |
| 5,751,819 A | 5/1998 | Dorrough |
| 5,761,320 A | 6/1998 | Farinelli et al. |
| 5,774,666 A | 6/1998 | Portuesi |
| 5,808,662 A | 9/1998 | Kinney et al. |
| 5,815,689 A | 9/1998 | Shaw et al. |
| 5,856,827 A | 1/1999 | Sudo |
| 5,867,691 A | 2/1999 | Shiraishi |
| 5,875,354 A | 2/1999 | Charlton et al. |
| 5,887,143 A | 3/1999 | Saito et al. |
| 5,923,902 A | 7/1999 | Inagaki |
| 5,946,343 A | 8/1999 | Schotz et al. |
| 5,956,088 A | 9/1999 | Shen et al. |
| 6,002,862 A | 12/1999 | Takaike |
| 6,009,457 A | 12/1999 | Moller |
| 6,026,150 A | 2/2000 | Frank et al. |
| 6,031,818 A | 2/2000 | Lo et al. |
| 6,032,202 A | 2/2000 | Lea et al. |
| 6,108,686 A | 8/2000 | Williams, Jr. |
| 6,128,318 A | 10/2000 | Sato |
| 6,157,957 A | 12/2000 | Berthaud |
| 6,175,872 B1 | 1/2001 | Neumann et al. |
| 6,181,316 B1 | 1/2001 | Little et al. |
| 6,185,737 B1 | 2/2001 | Northcutt et al. |
| 6,195,436 B1 | 2/2001 | Scibora et al. |
| 6,199,169 B1 | 3/2001 | Voth |
| 6,255,961 B1 | 7/2001 | Van Ryzin et al. |
| 6,256,554 B1 | 7/2001 | Dilorenzo |
| 6,308,207 B1 | 10/2001 | Tseng et al. |
| 6,324,586 B1 | 11/2001 | Johnson |
| 6,332,147 B1 | 12/2001 | Moran et al. |
| 6,349,339 B1 | 2/2002 | Williams |
| 6,351,821 B1 | 2/2002 | Voth |
| 6,404,811 B1 | 6/2002 | Cvetko et al. |
| 6,430,353 B1 | 8/2002 | Honda et al. |
| 6,469,633 B1 | 10/2002 | Wachter |
| 6,487,296 B1 | 11/2002 | Allen et al. |
| 6,522,886 B1 | 2/2003 | Youngs et al. |
| 6,526,325 B1 | 2/2003 | Sussman et al. |
| 6,587,127 B1 | 7/2003 | Leeke et al. |
| 6,594,691 B1 | 7/2003 | McCollum et al. |
| 6,598,172 B1 | 7/2003 | Vandeusen et al. |
| 6,611,537 B1 | 8/2003 | Edens et al. |
| 6,631,410 B1 | 10/2003 | Kowalski et al. |
| 6,674,803 B1 | 1/2004 | Kesselring |
| 6,728,531 B1 | 4/2004 | Lee et al. |
| 6,732,155 B2 | 5/2004 | Meek |
| 6,757,517 B2 | 6/2004 | Chang et al. |
| 6,778,869 B2 | 8/2004 | Champion |
| 6,826,283 B1 | 11/2004 | Wheeler et al. |
| 6,836,788 B2 | 12/2004 | Kim et al. |
| 6,898,642 B2 | 5/2005 | Chafle et al. |
| 6,912,610 B2 | 6/2005 | Spencer |
| 6,920,373 B2 | 7/2005 | Xi et al. |
| 6,934,766 B1 | 8/2005 | Russell |
| 6,985,694 B1 | 1/2006 | De Bonet et al. |
| 7,007,106 B1 | 2/2006 | Flood et al. |
| 7,017,118 B1 | 3/2006 | Carroll |
| 7,020,048 B2 | 3/2006 | McComas |
| 7,020,791 B1 | 3/2006 | Aweya et al. |
| 7,043,651 B2 | 5/2006 | Aweya et al. |
| 7,047,308 B2 | 5/2006 | Deshpande |
| 7,113,833 B1 | 9/2006 | Brown et al. |
| 7,113,999 B2 | 9/2006 | Pestoni et al. |
| 7,115,017 B1 | 10/2006 | Laursen et al. |
| 7,117,451 B2 | 10/2006 | Sielken |
| 7,124,125 B2 | 10/2006 | Cook et al. |
| 7,130,608 B2 | 10/2006 | Hollstrom et al. |
| 7,130,616 B2 | 10/2006 | Janik |
| 7,143,141 B1 | 11/2006 | Morgan et al. |
| 7,143,939 B2 | 12/2006 | Henzerling |
| 7,162,315 B2 | 1/2007 | Gilbert |
| 7,185,090 B2 | 2/2007 | Kowalski |
| 7,187,947 B1 | 3/2007 | White et al. |
| 7,206,367 B1 | 4/2007 | Moore et al. |
| 7,209,795 B2 | 4/2007 | Sullivan et al. |
| 7,218,708 B2 | 5/2007 | Berezowski et al. |
| 7,236,739 B2 | 6/2007 | Chang et al. |
| 7,236,773 B2 | 6/2007 | Thomas |
| 7,281,034 B1 | 10/2007 | Eyal |
| 7,293,060 B2 | 11/2007 | Komsi |
| 7,295,548 B2 | 11/2007 | Blank |
| 7,302,468 B2 | 11/2007 | Wijeratne |
| 7,312,785 B2 | 12/2007 | Tsuk et al. |
| 7,324,857 B2 | 1/2008 | Goddard |
| 7,333,519 B2 | 2/2008 | Sullivan et al. |
| 7,358,960 B2 | 4/2008 | Mak |
| 7,372,846 B2 | 5/2008 | Zwack |
| 7,391,791 B2 | 6/2008 | Balassanian et al. |
| 7,392,102 B2 | 6/2008 | Sullivan et al. |
| 7,483,538 B2 | 1/2009 | McCarty |
| 7,483,958 B1 | 1/2009 | Elabbady et al. |
| 7,496,623 B2 | 2/2009 | Szeto |
| 7,496,633 B2 | 2/2009 | Szeto |
| 7,571,014 B1 | 8/2009 | Lambourne |
| 7,574,274 B2 | 8/2009 | Holmes |
| 7,599,685 B2 | 10/2009 | Goldberg et al. |
| 7,630,501 B2 | 12/2009 | Blank et al. |
| 7,643,894 B2 | 1/2010 | Braithwaite et al. |
| 7,657,224 B2 | 2/2010 | Goldberg et al. |
| 7,657,644 B1 | 2/2010 | Zheng |
| 7,657,910 B1 | 2/2010 | McAulay et al. |
| 7,668,990 B2 | 2/2010 | Krzyzanowski et al. |
| 7,669,219 B2 | 2/2010 | Scott |
| 7,675,943 B2 | 3/2010 | Mosig et al. |
| 7,676,142 B1 | 3/2010 | Hung |
| 7,702,279 B2 | 4/2010 | Ko et al. |
| 7,720,096 B2 | 5/2010 | Klemets |
| 7,725,533 B2 | 5/2010 | Szeto et al. |

(56) References Cited

U.S. PATENT DOCUMENTS

| | | |
|---|---|---|
| 7,725,551 B2 | 5/2010 | Szeto et al. |
| 7,739,271 B2 | 6/2010 | Cook et al. |
| 7,742,740 B2 | 6/2010 | Goldberg et al. |
| 7,788,138 B2 | 8/2010 | Viehmann et al. |
| 7,805,682 B1 | 9/2010 | Lambourne |
| 7,835,689 B2 | 11/2010 | Goldberg et al. |
| 7,853,341 B2 | 12/2010 | McCarty |
| 7,865,137 B2 | 1/2011 | Goldberg et al. |
| 7,885,622 B2 | 2/2011 | Krampf et al. |
| 7,916,877 B2 | 3/2011 | Goldberg et al. |
| 7,917,082 B2 | 3/2011 | Goldberg et al. |
| 7,921,369 B2 | 4/2011 | Bill |
| 7,934,239 B1 | 4/2011 | Dagman |
| 7,987,294 B2 | 7/2011 | Bryce et al. |
| 7,996,566 B1 | 8/2011 | Sylvain et al. |
| 8,014,423 B2 | 9/2011 | Thaler et al. |
| 8,023,663 B2 | 9/2011 | Goldberg |
| 8,028,038 B2 | 9/2011 | Weel |
| 8,028,323 B2 | 9/2011 | Weel |
| 8,045,952 B2 | 10/2011 | Qureshey et al. |
| 8,050,652 B2 | 11/2011 | Qureshey et al. |
| 8,074,253 B1 | 12/2011 | Nathan |
| 8,086,752 B2 | 12/2011 | Millington et al. |
| 8,103,009 B2 | 1/2012 | McCarty et al. |
| 8,112,032 B2 | 2/2012 | Ko et al. |
| 8,131,390 B2 | 3/2012 | Braithwaite et al. |
| 8,169,938 B2 | 5/2012 | Duchscher et al. |
| 8,200,602 B2 | 6/2012 | Farrelly |
| 8,214,873 B2 | 7/2012 | Weel |
| 8,230,099 B2 | 7/2012 | Weel |
| 8,234,395 B2 | 7/2012 | Millington et al. |
| 8,271,115 B2 | 9/2012 | Yoshida |
| 8,290,603 B1 | 10/2012 | Lambourne et al. |
| 8,315,555 B2 | 11/2012 | Ko et al. |
| 8,370,678 B2 | 2/2013 | Millington et al. |
| 8,423,659 B2 | 4/2013 | Millington |
| 8,483,853 B1 | 7/2013 | Lambourne et al. |
| 8,521,316 B2 | 8/2013 | Louboutin |
| 8,588,949 B2 | 11/2013 | Lambourne et al. |
| 8,613,385 B1 | 12/2013 | Hulet et al. |
| 8,666,826 B2 | 3/2014 | Narayanan et al. |
| 8,775,546 B2 | 7/2014 | Millington |
| 8,826,135 B1 | 9/2014 | Durham et al. |
| 8,843,500 B2 | 9/2014 | Nogues et al. |
| 8,892,648 B1 | 11/2014 | Durham et al. |
| 8,910,265 B2 | 12/2014 | Lang et al. |
| 8,942,252 B2 | 1/2015 | Balassanian et al. |
| 8,990,701 B2 | 3/2015 | Olofsson |
| 9,052,810 B2 | 6/2015 | Reimann et al. |
| 9,137,564 B2 | 9/2015 | Reimann |
| 9,165,255 B1 | 10/2015 | Shetty et al. |
| 9,229,938 B1 | 1/2016 | Jaini et al. |
| 9,246,866 B1 | 1/2016 | Sanders |
| 9,247,363 B2 | 1/2016 | Triplett et al. |
| 9,286,384 B2 | 3/2016 | Kuper et al. |
| 9,344,292 B2 | 5/2016 | Griffiths et al. |
| 9,374,607 B2 | 6/2016 | Bates et al. |
| 9,478,247 B2 | 10/2016 | Chen et al. |
| 9,489,383 B2 | 11/2016 | Hyman et al. |
| 9,510,055 B2 | 11/2016 | Kuper et al. |
| 9,524,338 B2 | 12/2016 | Van Der Heide et al. |
| 9,696,874 B2 | 7/2017 | Kulick et al. |
| 9,715,500 B2 | 7/2017 | Cue et al. |
| 9,756,092 B2 | 9/2017 | Zhang et al. |
| 9,942,335 B2 | 4/2018 | Schneider et al. |
| 10,032,233 B2 | 7/2018 | Papakipos et al. |
| 10,129,599 B2 | 11/2018 | Van Der Heide |
| 2001/0009604 A1 | 7/2001 | Ando et al. |
| 2001/0022823 A1 | 9/2001 | Renaud |
| 2001/0032188 A1 | 10/2001 | Miyabe et al. |
| 2001/0042107 A1 | 11/2001 | Palm |
| 2002/0002039 A1 | 1/2002 | Qureshey et al. |
| 2002/0002562 A1 | 1/2002 | Moran et al. |
| 2002/0003548 A1 | 1/2002 | Krusche et al. |
| 2002/0022453 A1 | 2/2002 | Balog et al. |
| 2002/0026442 A1 | 2/2002 | Lipscomb et al. |
| 2002/0034374 A1 | 3/2002 | Barton |
| 2002/0042844 A1 | 4/2002 | Chiazzese |
| 2002/0049843 A1 | 4/2002 | Barone et al. |
| 2002/0054134 A1 | 5/2002 | Kelts et al. |
| 2002/0056117 A1 | 5/2002 | Hasegawa et al. |
| 2002/0065926 A1 | 5/2002 | Hackney et al. |
| 2002/0072816 A1 | 6/2002 | Shdema et al. |
| 2002/0073228 A1 | 6/2002 | Cognet et al. |
| 2002/0090914 A1 | 7/2002 | Kang et al. |
| 2002/0093478 A1 | 7/2002 | Yeh |
| 2002/0109710 A1 | 8/2002 | Holtz et al. |
| 2002/0112244 A1 | 8/2002 | Liou et al. |
| 2002/0116476 A1 | 8/2002 | Eyal et al. |
| 2002/0124097 A1 | 9/2002 | Isely et al. |
| 2002/0129156 A1 | 9/2002 | Yoshikawa |
| 2002/0143998 A1 | 10/2002 | Rajagopal et al. |
| 2002/0163361 A1 | 11/2002 | Parkin |
| 2002/0165921 A1 | 11/2002 | Sapieyevski |
| 2002/0178191 A1 | 11/2002 | Sielken |
| 2002/0188762 A1 | 12/2002 | Tomassetti et al. |
| 2003/0002609 A1 | 1/2003 | Faller et al. |
| 2003/0020763 A1 | 1/2003 | Mayer et al. |
| 2003/0023741 A1 | 1/2003 | Tomassetti |
| 2003/0035444 A1 | 2/2003 | Zwack |
| 2003/0041173 A1 | 2/2003 | Hoyle |
| 2003/0041174 A1 | 2/2003 | Wen et al. |
| 2003/0043924 A1 | 3/2003 | Haddad et al. |
| 2003/0066094 A1 | 4/2003 | Van Der Schaar et al. |
| 2003/0088875 A1 | 5/2003 | Gay et al. |
| 2003/0099212 A1 | 5/2003 | Anjum et al. |
| 2003/0099221 A1 | 5/2003 | Rhee |
| 2003/0105820 A1 | 6/2003 | Haims et al. |
| 2003/0126211 A1 | 7/2003 | Anttila et al. |
| 2003/0157951 A1 | 8/2003 | Hasty |
| 2003/0195964 A1 | 10/2003 | Mane |
| 2003/0198257 A1 | 10/2003 | Sullivan et al. |
| 2003/0210796 A1 | 11/2003 | McCarty |
| 2003/0220973 A1 | 11/2003 | Zhu et al. |
| 2003/0231871 A1 | 12/2003 | Ushimaru |
| 2003/0235304 A1 | 12/2003 | Evans et al. |
| 2004/0001484 A1 | 1/2004 | Ozguner |
| 2004/0001591 A1 | 1/2004 | Mani et al. |
| 2004/0008852 A1 | 1/2004 | Also et al. |
| 2004/0010727 A1 | 1/2004 | Fujinami |
| 2004/0015252 A1 | 1/2004 | Aiso et al. |
| 2004/0024478 A1 | 2/2004 | Hans et al. |
| 2004/0024925 A1 | 2/2004 | Cypher et al. |
| 2004/0025185 A1 | 2/2004 | Goci et al. |
| 2004/0027166 A1 | 2/2004 | Mangum et al. |
| 2004/0032348 A1 | 2/2004 | Lai et al. |
| 2004/0066736 A1 | 4/2004 | Kroeger |
| 2004/0075767 A1 | 4/2004 | Neuman et al. |
| 2004/0078383 A1 | 4/2004 | Mercer et al. |
| 2004/0078812 A1 | 4/2004 | Calvert |
| 2004/0088328 A1 | 5/2004 | Cook et al. |
| 2004/0131192 A1 | 7/2004 | Metcalf |
| 2004/0170383 A1 | 9/2004 | Mazur |
| 2004/0203378 A1 | 10/2004 | Powers |
| 2004/0215611 A1 | 10/2004 | Jawa et al. |
| 2004/0249965 A1 | 12/2004 | Huggins et al. |
| 2004/0249982 A1 | 12/2004 | Arnold et al. |
| 2004/0252400 A1 | 12/2004 | Blank et al. |
| 2004/0261040 A1 | 12/2004 | Radcliffe et al. |
| 2005/0010691 A1 | 1/2005 | Oyadomari et al. |
| 2005/0013394 A1 | 1/2005 | Rausch et al. |
| 2005/0021590 A1 | 1/2005 | Debique et al. |
| 2005/0047605 A1 | 3/2005 | Lee et al. |
| 2005/0058149 A1 | 3/2005 | Howe |
| 2005/0081213 A1 | 4/2005 | Suzuoki et al. |
| 2005/0108320 A1 | 5/2005 | Lord et al. |
| 2005/0114538 A1 | 5/2005 | Rose |
| 2005/0125357 A1 | 6/2005 | Saadat et al. |
| 2005/0155072 A1 | 7/2005 | Kaczowka et al. |
| 2005/0166157 A1 | 7/2005 | Ollis et al. |
| 2005/0166258 A1 | 7/2005 | Vasilevsky et al. |
| 2005/0177643 A1 | 8/2005 | Xu |
| 2005/0181348 A1 | 8/2005 | Carey et al. |
| 2005/0195205 A1 | 9/2005 | Abrams, Jr. |

(56) References Cited

U.S. PATENT DOCUMENTS

| | | |
|---|---|---|
| 2005/0201254 A1 | 9/2005 | Looney et al. |
| 2005/0234875 A1 | 10/2005 | Auerbach et al. |
| 2005/0281255 A1 | 12/2005 | Davies et al. |
| 2005/0283820 A1 | 12/2005 | Richards et al. |
| 2005/0288805 A1 | 12/2005 | Moore et al. |
| 2005/0289224 A1 | 12/2005 | Deslippe et al. |
| 2006/0095516 A1 | 5/2006 | Wijeratne |
| 2006/0107237 A1 | 5/2006 | Kim |
| 2006/0119497 A1 | 6/2006 | Miller et al. |
| 2006/0143236 A1 | 6/2006 | Wu |
| 2006/0168340 A1 | 7/2006 | Heller et al. |
| 2006/0195462 A1 | 8/2006 | Rogers |
| 2006/0195479 A1 | 8/2006 | Spiegelman et al. |
| 2006/0195480 A1 | 8/2006 | Spiegelman et al. |
| 2006/0253436 A1 | 11/2006 | Cook et al. |
| 2006/0253782 A1 | 11/2006 | Stark et al. |
| 2006/0294074 A1 | 12/2006 | Chang |
| 2007/0033402 A1 | 2/2007 | Williams et al. |
| 2007/0038999 A1 | 2/2007 | Millington et al. |
| 2007/0043847 A1 | 2/2007 | Carter et al. |
| 2007/0048713 A1 | 3/2007 | Plastina et al. |
| 2007/0049256 A1 | 3/2007 | Wassingbo |
| 2007/0054680 A1 | 3/2007 | Mo et al. |
| 2007/0088747 A1 | 4/2007 | Cheng et al. |
| 2007/0136778 A1 | 6/2007 | Birger et al. |
| 2007/0142022 A1 | 6/2007 | Madonna et al. |
| 2007/0142944 A1 | 6/2007 | Goldberg et al. |
| 2007/0143493 A1 | 6/2007 | Mullig et al. |
| 2007/0169115 A1 | 7/2007 | Ko et al. |
| 2007/0180137 A1 | 8/2007 | Rajapakse |
| 2007/0214182 A1* | 9/2007 | Rosenberg ............. G06Q 30/06 |
| 2007/0224937 A1 | 9/2007 | Jung et al. |
| 2007/0271232 A1 | 11/2007 | Mattox et al. |
| 2007/0271388 A1 | 11/2007 | Bowra et al. |
| 2007/0288470 A1 | 12/2007 | Kauniskangas et al. |
| 2007/0294131 A1 | 12/2007 | Roman et al. |
| 2007/0299778 A1 | 12/2007 | Haveson et al. |
| 2008/0005690 A1 | 1/2008 | Van Vugt |
| 2008/0016465 A1 | 1/2008 | Foxenland |
| 2008/0022320 A1 | 1/2008 | Ver Steeg |
| 2008/0052371 A1 | 2/2008 | Partovi et al. |
| 2008/0059510 A1 | 3/2008 | Cardamore et al. |
| 2008/0077261 A1 | 3/2008 | Baudino et al. |
| 2008/0086368 A1 | 4/2008 | Bauman et al. |
| 2008/0091771 A1 | 4/2008 | Allen et al. |
| 2008/0109529 A1 | 5/2008 | Story |
| 2008/0120429 A1 | 5/2008 | Millington et al. |
| 2008/0144861 A1 | 6/2008 | Melanson et al. |
| 2008/0152165 A1 | 6/2008 | Zacchi |
| 2008/0154959 A1 | 6/2008 | Dunko |
| 2008/0194276 A1 | 8/2008 | Lin et al. |
| 2008/0301280 A1 | 12/2008 | Chasen et al. |
| 2008/0319833 A1 | 12/2008 | Svendsen |
| 2009/0005893 A1 | 1/2009 | Sugii et al. |
| 2009/0031336 A1 | 1/2009 | Chavez et al. |
| 2009/0041423 A1 | 2/2009 | Weber et al. |
| 2009/0063414 A1 | 3/2009 | White et al. |
| 2009/0076881 A1 | 3/2009 | Svendsen |
| 2009/0076917 A1 | 3/2009 | Jablokov et al. |
| 2009/0083117 A1 | 3/2009 | Svendsen et al. |
| 2009/0133069 A1 | 5/2009 | Conness et al. |
| 2009/0150806 A1 | 6/2009 | Evje et al. |
| 2009/0157905 A1 | 6/2009 | Davis |
| 2009/0175429 A1 | 7/2009 | Cohen et al. |
| 2009/0179867 A1 | 7/2009 | Shim et al. |
| 2009/0216855 A1 | 8/2009 | Lang et al. |
| 2009/0222115 A1 | 9/2009 | Malcolm et al. |
| 2009/0228919 A1 | 9/2009 | Zott et al. |
| 2009/0249222 A1 | 10/2009 | Schmidt et al. |
| 2009/0265426 A1 | 10/2009 | Svendsen et al. |
| 2009/0307062 A1 | 12/2009 | Lutnick et al. |
| 2009/0313369 A1 | 12/2009 | Wormington et al. |
| 2010/0010648 A1 | 1/2010 | Bull et al. |
| 2010/0017366 A1 | 1/2010 | Robertson et al. |
| 2010/0017714 A1 | 1/2010 | Agarwal et al. |
| 2010/0023578 A1 | 1/2010 | Brant et al. |
| 2010/0031366 A1 | 2/2010 | Knight et al. |
| 2010/0036950 A1 | 2/2010 | Bae et al. |
| 2010/0049835 A1 | 2/2010 | Ko et al. |
| 2010/0054275 A1 | 3/2010 | Noonan et al. |
| 2010/0082731 A1 | 4/2010 | Haughay et al. |
| 2010/0094834 A1 | 4/2010 | Svendsen et al. |
| 2010/0095332 A1 | 4/2010 | Gran et al. |
| 2010/0131567 A1 | 5/2010 | Dorogusker et al. |
| 2010/0162324 A1 | 6/2010 | Mehta et al. |
| 2010/0205222 A1 | 8/2010 | Gajdos et al. |
| 2010/0228740 A1 | 9/2010 | Cannistraro et al. |
| 2010/0235520 A1 | 9/2010 | Attanasio et al. |
| 2010/0262909 A1 | 10/2010 | Hsieh |
| 2010/0284389 A1 | 11/2010 | Ramsay et al. |
| 2010/0299391 A1 | 11/2010 | Demarta et al. |
| 2010/0299639 A1 | 11/2010 | Ramsay et al. |
| 2010/0318917 A1 | 12/2010 | Holladay et al. |
| 2010/0325218 A1 | 12/2010 | Castro et al. |
| 2010/0332326 A1 | 12/2010 | Ishai |
| 2011/0004330 A1 | 1/2011 | Rothkopf et al. |
| 2011/0041080 A1 | 2/2011 | Fleischman et al. |
| 2011/0066941 A1 | 3/2011 | Chipchase et al. |
| 2011/0066943 A1 | 3/2011 | Brillon et al. |
| 2011/0087842 A1 | 4/2011 | Lu et al. |
| 2011/0119706 A1 | 5/2011 | Scott et al. |
| 2011/0154173 A1 | 6/2011 | Herlein |
| 2011/0196888 A1 | 8/2011 | Hanson et al. |
| 2011/0202430 A1 | 8/2011 | Narayanan et al. |
| 2011/0202842 A1 | 8/2011 | Weatherly et al. |
| 2011/0211534 A1 | 9/2011 | Schmidt et al. |
| 2011/0225417 A1 | 9/2011 | Maharajh et al. |
| 2011/0238755 A1 | 9/2011 | Khan et al. |
| 2011/0246383 A1 | 10/2011 | Gibson et al. |
| 2011/0264732 A1 | 10/2011 | Robbin et al. |
| 2011/0314388 A1 | 12/2011 | Wheatley |
| 2012/0029671 A1 | 2/2012 | Millington et al. |
| 2012/0030366 A1 | 2/2012 | Collart et al. |
| 2012/0054278 A1 | 3/2012 | Taleb et al. |
| 2012/0059495 A1 | 3/2012 | Weiss et al. |
| 2012/0060046 A1 | 3/2012 | Millington |
| 2012/0071996 A1 | 3/2012 | Svendsen |
| 2012/0096526 A1 | 4/2012 | Brahmanapalli et al. |
| 2012/0117168 A1 | 5/2012 | Sugiyama et al. |
| 2012/0117185 A1 | 5/2012 | Cassidy |
| 2012/0117586 A1 | 5/2012 | McCoy et al. |
| 2012/0124176 A1 | 5/2012 | Curtis et al. |
| 2012/0129446 A1 | 5/2012 | Ko et al. |
| 2012/0151320 A1* | 6/2012 | McClements, IV ... G11B 27/34 715/230 |
| 2012/0158531 A1 | 6/2012 | Dion et al. |
| 2012/0159393 A1 | 6/2012 | Sethi et al. |
| 2012/0206623 A1 | 8/2012 | Nakama |
| 2012/0210205 A1 | 8/2012 | Sherwood et al. |
| 2012/0221951 A1 | 8/2012 | Kidron |
| 2012/0223639 A1 | 9/2012 | Baeumges et al. |
| 2012/0233067 A1 | 9/2012 | Matthew et al. |
| 2012/0233639 A1 | 9/2012 | Zott et al. |
| 2012/0272156 A1 | 10/2012 | Kerger et al. |
| 2012/0284423 A1 | 11/2012 | Weel et al. |
| 2012/0311635 A1 | 12/2012 | Mushkatblat et al. |
| 2012/0315884 A1 | 12/2012 | Forutanpour et al. |
| 2012/0331386 A1 | 12/2012 | Hicken et al. |
| 2013/0007617 A1 | 1/2013 | Mackenzie et al. |
| 2013/0024880 A1 | 1/2013 | Moloney-Egnatios et al. |
| 2013/0031162 A1 | 1/2013 | Willis et al. |
| 2013/0061205 A1 | 3/2013 | Reddy et al. |
| 2013/0070093 A1 | 3/2013 | Rivera et al. |
| 2013/0073584 A1* | 3/2013 | Kuper ............... G06F 16/24562 707/769 |
| 2013/0073979 A1 | 3/2013 | Shepherd et al. |
| 2013/0080599 A1 | 3/2013 | Ko et al. |
| 2013/0080955 A1 | 3/2013 | Reimann et al. |
| 2013/0081110 A1 | 3/2013 | McGowan |
| 2013/0094670 A1 | 4/2013 | Millington |
| 2013/0128038 A1 | 5/2013 | Cok et al. |
| 2013/0129232 A1 | 5/2013 | Cok et al. |
| 2013/0130729 A1 | 5/2013 | Cok et al. |
| 2013/0159858 A1 | 6/2013 | Joffray et al. |

(56) References Cited

U.S. PATENT DOCUMENTS

| | | |
|---|---|---|
| 2013/0166649 A1 | 6/2013 | Atzmon et al. |
| 2013/0173034 A1 | 7/2013 | Reimann et al. |
| 2013/0173531 A1 | 7/2013 | Rinearson et al. |
| 2013/0173794 A1 | 7/2013 | Agerbak et al. |
| 2013/0174204 A1 | 7/2013 | Coburn, IV et al. |
| 2013/0191454 A1 | 7/2013 | Oliver et al. |
| 2013/0191749 A1 | 7/2013 | Coburn, IV et al. |
| 2013/0198633 A1 | 8/2013 | Hyman |
| 2013/0221951 A1 | 8/2013 | Anderson et al. |
| 2013/0246522 A1 | 9/2013 | Bilinski et al. |
| 2013/0246916 A1 | 9/2013 | Reimann et al. |
| 2013/0254207 A1 | 9/2013 | Coburn, IV et al. |
| 2013/0254663 A1 | 9/2013 | Bates et al. |
| 2013/0297686 A1 | 11/2013 | Bilinski et al. |
| 2013/0310316 A1 | 11/2013 | Hellstrom et al. |
| 2013/0339397 A1 | 12/2013 | Herasymchuk |
| 2013/0339589 A1 | 12/2013 | Qawami et al. |
| 2013/0343567 A1 | 12/2013 | Triplett et al. |
| 2013/0346859 A1 | 12/2013 | Bates et al. |
| 2014/0025688 A1 | 1/2014 | Andler et al. |
| 2014/0047074 A1 | 2/2014 | Chung et al. |
| 2014/0052770 A1 | 2/2014 | Gran et al. |
| 2014/0059431 A1 | 2/2014 | Svendsen et al. |
| 2014/0067998 A1 | 3/2014 | Garcia et al. |
| 2014/0075308 A1 | 3/2014 | Sanders et al. |
| 2014/0075316 A1 | 3/2014 | Li |
| 2014/0081796 A1 | 3/2014 | Cohen |
| 2014/0093219 A1 | 4/2014 | Trivedi |
| 2014/0108528 A1 | 4/2014 | Papakipos et al. |
| 2014/0115061 A1 | 4/2014 | Reddy et al. |
| 2014/0122590 A1 | 5/2014 | Svendsen et al. |
| 2014/0181655 A1 | 6/2014 | Kumar et al. |
| 2014/0201197 A1 | 7/2014 | Kumar et al. |
| 2014/0201632 A1 | 7/2014 | Kunigita et al. |
| 2014/0201635 A1 | 7/2014 | Kumar et al. |
| 2014/0204076 A1 | 7/2014 | Kuper et al. |
| 2014/0208205 A1 | 7/2014 | Bartholomew |
| 2014/0223099 A1 | 8/2014 | Kidron |
| 2014/0237361 A1 | 8/2014 | Martin et al. |
| 2014/0244863 A1 | 8/2014 | Bradley et al. |
| 2014/0310058 A1 | 10/2014 | Aral et al. |
| 2014/0310779 A1 | 10/2014 | Lof et al. |
| 2014/0330951 A1 | 11/2014 | Sukoff et al. |
| 2014/0337959 A1 | 11/2014 | Garmark et al. |
| 2014/0341528 A1 | 11/2014 | Mahate et al. |
| 2014/0359680 A1 | 12/2014 | Shivadas et al. |
| 2015/0039620 A1 | 2/2015 | Ning |
| 2015/0046458 A1 | 2/2015 | Hu |
| 2015/0066892 A1 | 3/2015 | Astore |
| 2015/0067054 A1 | 3/2015 | Yoo et al. |
| 2015/0067871 A1 | 3/2015 | Commons et al. |
| 2015/0074534 A1 | 3/2015 | Didomenico et al. |
| 2015/0095170 A1 | 4/2015 | Lang et al. |
| 2015/0095680 A1 | 4/2015 | Gossain et al. |
| 2015/0113058 A1 | 4/2015 | Zhang et al. |
| 2015/0121220 A1 | 4/2015 | Lee et al. |
| 2015/0128162 A1 | 5/2015 | Ionescu et al. |
| 2015/0185599 A1 | 7/2015 | Mullins |
| 2015/0186110 A1 | 7/2015 | Kannan |
| 2015/0220498 A1 | 8/2015 | Munoz et al. |
| 2015/0286360 A1 | 10/2015 | Wachter et al. |
| 2015/0312299 A1 | 10/2015 | Chen et al. |
| 2015/0331940 A1* | 11/2015 | Manning ............ G06F 16/4387 707/740 |
| 2016/0063011 A1 | 3/2016 | Wehbi et al. |
| 2016/0082348 A1 | 3/2016 | Kehoe et al. |
| 2016/0147501 A1 | 5/2016 | Gilbert |
| 2016/0180248 A1 | 6/2016 | Regan |
| 2016/0253145 A1 | 9/2016 | Lee et al. |
| 2017/0161119 A1 | 6/2017 | Boyle et al. |
| 2017/0169522 A1 | 6/2017 | Hyman et al. |
| 2017/0236512 A1 | 8/2017 | Williams et al. |

FOREIGN PATENT DOCUMENTS

| | | |
|---|---|---|
| CN | 102947827 A | 2/2013 |
| CN | 104126309 A | 10/2014 |
| EP | 0251584 A2 | 1/1988 |
| EP | 0672985 A1 | 9/1995 |
| EP | 1111527 A2 | 6/2001 |
| EP | 1389853 A1 | 2/2004 |
| JP | 2004354721 A | 12/2004 |
| JP | 2007520808 A | 7/2007 |
| JP | 2009540638 A | 11/2009 |
| JP | 2010141748 A | 6/2010 |
| JP | 2011128957 | 6/2011 |
| JP | 2011223124 A | 11/2011 |
| KR | 20010090215 | 10/2001 |
| KR | 20050051785 | 6/2005 |
| KR | 1020070040592 | 4/2007 |
| KR | 20070048922 | 5/2007 |
| KR | 100890993 | 3/2009 |
| KR | 20100060498 A | 6/2010 |
| KR | 20100071724 | 6/2010 |
| KR | 20100134164 | 12/2010 |
| KR | 20110064635 | 6/2011 |
| KR | 20130083012 A | 7/2013 |
| WO | 199525313 | 9/1995 |
| WO | 199961985 | 12/1999 |
| WO | 200147248 | 6/2001 |
| WO | 200153994 | 7/2001 |
| WO | 02052540 A1 | 7/2002 |
| WO | 2003093950 A2 | 11/2003 |
| WO | 2005013047 A2 | 2/2005 |
| WO | 2005079071 A1 | 8/2005 |
| WO | 2007023120 A1 | 3/2007 |
| WO | 2010018429 A1 | 2/2010 |
| WO | 2011100264 A3 | 11/2011 |
| WO | 2011157891 A1 | 12/2011 |
| WO | 2012056326 A2 | 5/2012 |
| WO | 2012106269 | 8/2012 |
| WO | 2013139239 A1 | 9/2013 |
| WO | 2014004181 | 1/2014 |
| WO | 2014116693 A1 | 7/2014 |
| WO | 2014145746 | 9/2014 |

OTHER PUBLICATIONS

Preinterview First Office Action dated May 16, 2016, issued in connection with U.S. Appl. No. 14/495,633, filed Sep. 24, 2014, 6 pages.
Preinterview First Office Action dated Oct. 19, 2016, issued in connection with U.S. Appl. No. 14/821,513, filed Aug. 7, 2016, 5 pages.
Preinterview First Office Action dated May 23, 2016, issued in connection with U.S. Appl. No. 14/495,684, filed Sep. 24, 2014, 6 pages.
Presentations at WinHEC 2000, May 2000, 138 pages.
Prismiq, Inc., "Prismiq Media Player User Guide," 2003, 44 pages.
Rothermel et al., "An Adaptive Stream Synchronization Protocol," 5th International Workshop on Network and Operating System Support for Digital Audio and Video, 1995, 13 pages.
Schulzrinne H., et al., "RTP: A Transport Protocol for Real-Time Applications, RFC 3550," Network Working Group, 2003, pp. 1-89.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 20, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
U.S. Appl. No. 12/070,933, filed Feb. 22, 2008. "System, Method, and Computer Program for Remotely Managing a Digital Device" Inventor Jonathan Lang, et al.
U.S. Appl. No. 13/533,105, filed Jun. 26, 2012. "Systems, Methods, Apparatus, and Articles of Manufacture to Provide a Crowd-Sourced Playlist with Guess Access" Inventor Paul Bates, et al.

(56) References Cited

OTHER PUBLICATIONS

U.S. Appl. No. 13/533,785, filed Jun. 26, 2012. "Networked Music Playback Including Remote Discovery and Add to Queue" Inventor Mark Triplett, et al.
U.S. Appl. No. 13/748,357, filed Jan. 23, 2013. "System and Method for a Media Experience Social Interface" Inventor: Ron Kuper, et al.
U.S. Appl. No. 13/871,785, filed Apr. 26, 2013. "Systems, Methods, Apparatus, and Articles of Manufacture to Provide Guest Access" Inventor: Paul Bates, et al.
U.S. Appl. No. 13/871,795, filed Jun. 20, 2013. "Systems, Methods, Apparatus, and Articles of Manufacture to Provide Guest Access" Inventor: Paul Bates, et al.
U.S. Appl. No. 14/173,253, filed Feb. 5, 2014. "Remote Creation of a Playback Queue for a Future Event" Inventor: Jaime Munoz, et al.
Van Buskirk, Eliot, "Music Needs 'Connective Tissue' and Facebook Wants to Build It," E http://evolver.fm/2011/09/01/music-needs-connective-tissue-and-facebook-wants-to-build-it, 2011, 6 pages.
Yamaha DME 32 manual: copyright 2001.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Bluetooth. "Specification of the Bluetooth System: Wireless connections made easy," Core, Version 1.0 B, Dec. 1, 1999, 1076 pages.
Final Office Action dated Jan. 19, 2018, issued in connection with U.S. Appl. No. 14/297,193, filed Jun. 5, 2014, 32 pages.
Final Office Action dated Sep. 16, 2016, issued in connection with U.S. Appl. No. 14/275,112, filed May 12, 2014, 19 pages.
Final Office Action dated Feb. 16, 2017, issued in connection with U.S. Appl. No. 14/495,633, filed Sep. 24, 2014, 15 pages.
Final Office Action dated Feb. 10, 2016, issued in connection with U.S. Appl. No. 14/197,403, filed Mar. 5, 2014, 21 pages.
Final Office Action dated Nov. 8, 2016, issued in connection with U.S. Appl. No. 14/495,659, filed Sep. 24, 2014, 14 pages.
Final Office Action dated Oct. 7, 2016, issued in connection with U.S. Appl. No. 14/495,595, filed Sep. 24, 2014, 16 pages.
Final Office Action dated Feb. 7, 2017, issued in connection with U.S. Appl. No. 14/455,651, filed Aug. 8, 2014, 22 pages.
Final Office Action dated Apr. 6, 2016, issued in connection with U.S. Appl. No. 14/173,253, filed Feb. 5, 2014, 20 pages.
Final Office Action dated Nov. 3, 2016, issued in connection with U.S. Appl. No. 14/495,684, filed Sep. 24, 2014, 16 pages.
Final Office Action dated Nov. 2, 2017, issued in connection with U.S. Appl. No. 14/275,112, filed May 12, 2014, 20 pages.
European Patent Office, Summons to Attend Oral Proceedings dated Mar. 27, 2018, issued in connection with European Patent Application No. 15781794.1, 11 pages.
European Patent Office, Office Action dated Mar. 13, 2017, issued in connection with European Application No. 15781200.9, 5 pages.
European Patent Office, Office Action dated Jan. 13, 2017, issued in connection with European Application No. 15781794.1, 8 pages.
European Patent Office, Office Action dated Apr. 4, 2017, issued in connection with European Application No. 15775897.0, 6 pages.
Chinese Patent Office, First Office Action dated Feb. 27, 2019, issued in connection with Chinese Application No. 201580007534.X, 9 pages.
Chinese Patent Office, First Office Action dated Sep. 4, 2017, issued in connection with Chinese Application No. 2014800172148.0, 16 pages.
Chinese Patent Office, Second Office Action dated Apr. 11, 2018, issued in connection with Chinese Application No. 201480017214.8, 7 pages.
Chinese Patent Office, Third Office Action dated Oct. 18, 2018, issued in connection with Chinese Application No. 2014800172148, 8 pages.
Corrected Notice of Allowability dated Jan. 19, 2017, issued in connection with U.S. Appl. No. 14/197,403, filed Mar. 5, 2014, 2 pages.

Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, Decision to Refuse EP Application dated Oct. 16, 2018, issued in connection with European Application No. 157758970, 48 pages.
European Patent Office, Decision to Refuse EP Application dated Sep. 27, 2018, issued in connnection with European Application No. 15781794.1, 54 pages.
European Patent Office, EP Supplemental Search dated Dec. 19, 2017, issued in connection with EP Application No. 15829058.5, 12 pages.
European Patent Office, European Extended Search Report dated Feb. 5, 2018, issued in connection with EP Application No. 15803430.6, 8 pages.
European Patent Office, European Office Action dated Jan. 2, 2019, issued in connection with European Application No. 15829058.5, 4 pages.
European Patent Office, European Office Action dated Aug. 3, 2017, issued in connection with EP Application No. 15781794.1, 6 pages.
European Patent Office, European Supplemental Search Report dated Sep. 18, 2017, issued in connection with EP Application No. 15829058.5, 13 pages.
European Patent Office, European Supplemental Search Report dated Jan. 27, 2016, issued in connection with European Application No. 14743335.3, 8 pages.
European Patent Office, Examination Report dated Feb. 3, 2017, issued in connection with European Patent Application No. 14743335.3, 5 pages.
European Patent Office, Extended European Search Report dated Mar. 15, 2017, issued in connection with European Application No. 15758460.8, 9 pages.
European Patent Office, Extended European Search Report dated Dec. 23, 2016, issued in connection with European Application No. 15746781.2, 10 pages.
European Patent Office, Office Action dated Mar. 2, 2017, issued in connection with European Application No. 15775566.1, 7 pages.
Chinese Patent Office, First Office Action and Translation dated Feb. 2, 2019, issued in connection with Chinese Application No. 201580011640.5, 12 pages.
Advisory Action dated Feb. 1, 2017, issued in connection with U.S. Appl. No. 14/297,193, filed Jun. 5, 2014, 6 pages.
Advisory Action dated Feb. 3, 2017, issued in connection with U.S. Appl. No. 14/495,659, filed Sep. 24, 2014, 5 pages.
Advisory Action dated Jul. 12, 2016, issued in connection with U.S. Appl. No. 14/173,253, filed Feb. 5, 2014, 5 pages.
Advisory Action dated Mar. 19, 2019, issued in connection with U.S. Appl. No. 15/595,519, filed May 15, 2017, 3 pages.
Advisory Action dated Aug. 22, 2017, issued in connection with U.S. Appl. No. 14/173,253, filed Feb. 5, 2014, 4 pages.
Akyildiz et al., "Multimedia Group Synchronization Protocols for Integrated Services Networks," IEEE Journal on Selected Areas in Communications, 1996 pp. 162-173, vol. 14, No. 1.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Benslimane Abderrahim, "A Multimedia Synchronization Protocol for Multicast Groups," Proceedings of the 26th Euromicro Conference, 2000, pp. 456-463, vol. 1.
Biersack et al., "Infra- and Inter-Stream Synchronization for Stored Multimedia Streams," IEEE International Conference on Multimedia Computing and Systems, 1996, pp. 372-381.
Bluetooth. "Specification of the Bluetooth System: The ad hoc SCATTERNET for affordable and highly functional wireless connectivity," Core, Version 1.0 A, Jul. 26, 1999, 1068 pages.
Final Office Action dated Jan. 2, 2019, issued in connection with U.S. Appl. No. 15/595,519, filed May 15, 2017, 14 pages.
Bretl W.E., et al., MPEG2 Tutorial [online], 2000 [retrieved on Jan. 13, 2009] Retrieved from the Internet:(http://www.bretl.com/mpeghtml/MPEGindex.htm), pp. 1-23.
Final Office Action dated Oct. 20, 2016, issued in connection with U.S. Appl. No. 14/197,403, filed Mar. 5, 2016, 17 pages.

(56) References Cited

OTHER PUBLICATIONS

Final Office Action dated Mar. 28, 2018, issued in connection with U.S. Appl. No. 14/495,633, filed Sep. 24, 2014, 21 pages.
Final Office Action dated Oct. 29, 2018, issued in connection with U.S. Appl. No. 15/607,267, filed May 26, 2017, 17 pages.
Final Office Action dated Sep. 30, 2016, issued in connection with U.S. Appl. No. 14/297,193, filed Jun. 5, 2014, 34 pages.
Final Office Action dated May 31, 2017, issued in connection with U.S. Appl. No. 14/173,253, filed Feb. 5, 2014, 22 pages.
Final Office Action dated May 31, 2017, issued in connection with U.S. Appl. No. 14/821,513, filed Aug. 7, 2015, 16 pages.
First Action Interview Office Action dated Apr. 4, 2016, issued in connection with U.S. Appl. No. 14/275,112, filed May 12, 2014, 8 pages.
First Action Interview Office Action dated Jul. 7, 2016, issued in connection with U.S. Appl. No. 14/495,595, filed Sep. 24, 2014, 6 pages.
First Action Interview Office Action dated Jul. 11, 2016, issued in connection with U.S. Appl. No. 14/495,684, filed Sep. 24, 2014, 8 pages.
First Action Interview Office Action dated Jul. 13, 2016, issued in connection with U.S. Appl. No. 14/455,651, filed Aug. 8, 2014, 10 pages.
First Action Interview Office Action dated Oct. 13, 2016, issued in connection with U.S. Appl. No. 14/495,633, filed Sep. 24, 2014, 8 pages.
First Action Interview Office Action dated Dec. 14, 2016, issued in connection with U.S. Appl. No. 14/821,513, filed Aug. 7, 2015, 10 pages.
First Action Interview Office Action dated Jul. 22, 2016, issued in connection with U.S. Appl. No. 14/495,659, filed Sep. 24, 2014, 8 pages.
First Action Interview Pilot Program Pre-Interview Communication dated Oct. 28, 2015, issued in connection with U.S. Appl. No. 14/275,112, filed May 12, 2014, 4 pages.
First Action Interview Pilot Program Pre-Interview Communication dated Apr. 3, 2017, issued in connection with U.S. Appl. No. 14/495,590, filed Sep. 24, 2014, 5 pages.
Huang C.M., et al., "A Synchronization Infrastructure for Multicast Multimedia at the Presentation Layer," IEEE Transactions on Consumer Electronics, 1997, pp. 370-380, vol. 43, No. 3.
International Bureau, International Preliminary Report on Patentability dated Jan. 30, 2014, issued in connection with International Application No. PCT/US2012/047620, filed on Jul. 20, 2012, 7 pages.
International Bureau, International Preliminary Report on Patentability dated Apr. 3, 2014, issued in connection with International Application No. PCT/US2012/056467, filed on Sep. 21, 2011, 11 pages.
International Bureau, International Preliminary Report on Patentability, dated Aug. 6, 2015, issued in connection with International Application No. PCT/US2014/012534, filed Jan. 22, 2014, 6 pages.
International Bureau, International Preliminary Report on Patentability dated Dec. 15, 2016, issued in connection with International Application No. PCT/US2015/031934, filed on May 21, 2015, 11 pages.
International Bureau, International Preliminary Report on Patentability dated Aug. 18, 2016, issued in connection with International Application No. PCT/US2015/014156, filed on Feb. 3, 2015, 10 pages.
International Bureau,International Preliminary Report on Patentability dated Sep. 15, 2016, issued in connection with International Application No. PCT/US2015/018850, filed on Mar. 5, 2015, 10 pages.
International Searching Authority, International Preliminary Report on Patentability dated Apr. 6, 2017, issued in connection with International Application No. PCT/US2015/051968 filed on Sep. 24, 2015, 10 pages.

International Searching Authority, International Preliminary Report on Patentability dated Apr. 6, 2017, issued in connection with International Application No. PCT/US2015/051975 filed on Sep. 24, 2015, 9 pages.
International Searching Authority, International Preliminary Report on Patentability dated Apr. 6, 2017, issued in connection with International Application No. PCT/US2015/051983 filed on Sep. 24, 2015, 7 pages.
International Searching Authority, International Preliminary Report on Patentability dated Apr. 6, 2017, issued in connection with International Application No. PCT/US2015/051989 filed on Sep. 24, 2015, 7 pages.
International Searching Authority, International Preliminary Report on Patentability dated Apr. 6, 2017, issued in connection with International Application No. PCT/US2015/051993 filed on Sep. 24, 2015, 8 pages.
International Searching Authority, International Preliminary Report on Patentability dated Feb. 23, 2017, issued in connection with International Application No. PCT/US2015/044218, filed on Aug. 7, 2015, 10 pages.
International Searching Authority, International Search Report and Written Opinion dated Nov. 6, 2015, issued in connection with International Application No. PCT/US2015/051993, filed on Sep. 24, 2015, 10 pages.
International Searching Authority, International Search Report and Written Opinion dated Dec. 7, 2015, issued in connection with International Application No. PCT/US2015/051968, filed on Sep. 24, 2015, 14 pages.
International Searching Authority, International Search Report and Written Opinion dated Dec. 16, 2015, issued in connection with International Application No. PCT/US2015/051989 filed on Sep. 24, 2015, 11 pages.
International Searching Authority, International Search Report and Written Opinion dated Dec. 21, 2015, issued in connection with International Application No. PCT/US2015/051983 filed on Sep. 24, 2015, 11 pages.
International Searching Authority, International Search Report and Written Opinion dated Nov. 23, 2015, issued in connection with International Application No. PCT/US2015/051975, filed on Sep. 24, 2015, 14 pages.
International Searching Authority, International Search Report and Written Opinion dated Apr. 24, 2015, issued in connection with International Application No. PCT/US2015/014156, filed on Feb. 3, 2015, 13 pages.
International Searching Authority, International Search Report and Written Opinion dated Aug. 27, 2015, issued in connection with International Application No. PCT/US2015/031934, filed on May 21, 2015, 14 pages.
International Searching Authority, International Search Report and Written Opinion dated Nov. 27, 2015, issued in connection with International Application No. PCT/US2015/044218, filed on Aug. 7, 2015, 13 pages.
International Searching Authority, International Search Report and Written Opinion dated May 29, 2015, issued in connection with International Application No. PCT/US2015/018850, filed on Mar. 5, 2015, 13 pages.
International Searching Authority, International Search Report dated May 8, 2014, issued in connection with International Application No. PCT/US2014/012534, filed on Jan. 24, 2014, 3 pages.
International Searching Authority, International Search Report dated Dec. 27, 2012, issued in connection with International Application No. PCT/US2012/047620, filed on Jul. 20, 2011, 3 pages.
International Searching Authority, Written Opinion dated Dec. 27, 2012, issued in connection with International Application No. PCT/US2012/047620, filed on Jul. 20, 2011, 5 pages.
International Searhing Authority, International Search Report and Written Opinion dated Feb. 28, 2013, issued in connection with International Application No. PCT/US2012/056467, filed on Sep. 21, 2012, 12 pages.
Ishibashi et al., "A Group Synchronization Mechanism for Live Media in Multicast Communications," IEEE Global Telecommunications Conference, 1997, pp. 746-752, vol. 2.

(56) References Cited

OTHER PUBLICATIONS

Ishibashi et al., "A Group Synchronization Mechanism for Stored Media in Multicast Communications," IEEE Information Revolution and Communications, 1997, pp. 692-700, vol. 2.
Japanese Patent Office, Full English Translation of Office Action dated Nov. 28, 2017, issued in connection with Japanese Patent Application No. 2016-555529, 2 pages.
Japanese Patent Office, Notice of Rejection dated Nov. 8, 2016, issued in connection with Japanese Application No. 2015-555237, 6 pages.
Japanese Patent Office, Office Action dated Nov. 28, 2017, issued in connection with Japanese Patent Application No. 2016-555529, 5 pages.
Japanese Patent Office, Office Action dated Nov. 7, 2017, issued in connection with Japanese Patent Application No. 2016-550231, 5 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Mills David L., "Network Time Protocol (Version 3) Specification, Implementation and Analysis," Network Working Group, Mar. 1992, 7 pages.
Mills, David L., "Precision Synchronization of Computer Network Clocks," ACM SIGCOMM Computer Communication Review, 1994, pp. 28-43, vol. 24, No. 2.
Motorola, "Simplefi, Wireless Digital Audio Receiver, Installation and User Guide," Dec. 31, 2001, 111 pages.
Nilsson, M., "ID3 Tag Version 2," Mar. 26, 1998, 28 pages.
Non-Final Office Action dated Nov. 1, 2016, issued in connection with U.S. Appl. No. 14/173,253, filed Feb. 5, 2014, 21 pages.
Non-Final Office Action dated Oct. 1, 2015, issued in connection with U.S. Appl. No. 13/748,357, filed Jan. 23, 2013, 18 pages.
Non-Final Office Action dated Oct. 3, 2017, issued in connection with U.S. Appl. No. 14/495,633, filed Sep. 24, 2014, 18 pages.
Non-Final Office Action dated Apr. 6, 2016, issued in connection with U.S. Appl. No. 14/297,193, filed Jun. 5, 2014, 26 pages.
Non-Final Office Action dated May 6, 2015, issued in connection with U.S. Appl. No. 13/748,357, filed Jan. 23, 2013, 17 pages.
Non-Final Office Action dated Jul. 10, 2017, issued in connection with U.S. Appl. No. 14/297,193, filed Jun. 5, 2014, 33 pages.
Non-Final Office Action dated Sep. 10, 2015, issued in connection with U.S. Appl. No. 14/197,403, filed Mar. 5, 2014, 16 pages.
Non-Final Office Action dated Jan. 12, 2017, issued in connection with U.S. Appl. No. 14/275,112, filed May 12, 2014, 25 pages.
Non-Final Office Action dated Nov. 13, 2018, issued in connection with U.S. Appl. No. 16/143,301, filed Sep. 26, 2018, 27 pages.
Non-Final Office Action dated Jun. 14, 2017, issued in connection with U.S. Appl. No. 14/495,659, filed Sep. 24, 2014, 15 pages.
Non-Final Office Action dated Jan. 16, 2019, issued in connection with U.S. Appl. No. 15/664,634, filed Jul. 31, 2017, 17 pages.
Non-Final Office Action dated Dec. 17, 2015, issued in connection with U.S. Appl. No. 14/173,253, filed Feb. 5, 2014, 18 pages.
Non-Final Office Action dated Jun. 17, 2016, issued in connection with U.S. Appl. No. 14/495,706, filed Sep. 24, 2014, 19 pages.
Non-Final Office Action dated May 18, 2016, issued in connection with U.S. Appl. Appl. No. 14/197,403, filed Mar. 5, 2014, 21 pages.
Non-Final Office Action dated Feb. 19, 2019, issued in connection with U.S. Appl. No. 15/966,337, filed Apr. 30, 2018, 14 pages.
Non-Final Office Action dated Mar. 19, 2019, issued in connection with U.S. Appl. No. 15/607,267, filed May 26, 2017, 18 pages.
Non-Final Office Action dated Jun. 21, 2018, issued in connection with U.S. Appl. No. 15/692,090, filed Aug. 31, 2017, 20 pages.
Non-Final Office Action dated Jan. 22, 2019, issued in connection with U.S. Appl. No. 16/174,703, filed Oct. 30, 2018, 15 pages.
Non-Final Office Action dated Mar. 23, 2018, issued in connection with U.S. Appl. No. 15/227,074, filed Aug. 3, 2016, 11 pages.
Non-Final Office Action dated Jan. 24, 2018, issued in connection with U.S. Appl. No. 15/607,267, filed May 26, 2017, 17 pages.
Non-Final Office Action dated Dec. 27, 2018, issued in connection with U.S. Appl. No. 14/297,193, filed Jun. 5, 2014, 37 pages.
Non-Final Office Action dated Nov. 28, 2017, issued in connection with U.S. Appl. No. 14/821,513, filed Aug. 7, 2015, 17 pages.
Non-Final Office Action dated Apr. 4, 2019, issued in connection with U.S. Appl. No. 15/612,126, filed Jun. 2, 2017, 9 pages.
Non-Final Office Action dated Dec. 6, 2018, issued in connection with U.S. Appl. No. 14/495,633, filed Sep. 24, 2014, 15 pages.
North American MPEG-2 Information, "The MPEG-2 Transport Stream," Retrieved from the Internet: URL: http://www.coolstf.com/mpeg/#ts, 2006, pp. 1-5.
Notice of Allowance dated May 4, 2016, issued in connection with U.S. Appl. No. 13/748,357, filed Jan. 23, 2013, 11 pages.
Notice of Allowance dated Apr. 6, 2017, issued in connection with U.S. Appl. No. 14/197,403, filed Mar. 5, 2014, 5 pages.
Notice of Allowance dated Feb. 11, 2019, issued in connection with U.S. Appl. No. 15/692,090, filed Aug. 31, 2017, 8 pages.
Notice of Allowance dated Feb. 11, 2019, issued in connection with U.S. Appl. No. 16/143,301, filed Sep. 26, 2018, 15 pages.
Notice of Allowance dated Jan. 12, 2017, issued in connection with U.S. Appl. No. 14/495,595, filed Sep. 24, 2014, 5 pages.
Notice of Allowance dated Jul. 18, 2018, issued in connection with U.S. Appl. No. 15/227,074, filed Aug. 3, 2016, 8 pages.
Notice of Allowance dated Sep. 19, 2017, issued in connection with U.S. Appl. No. 14/455,651, filed Aug. 8, 2014, 12 pages.
Notice of Allowance dated Aug. 24, 2017, issued in connection with U.S. Appl. No. 14/495,590, filed Sep. 24, 2014, 10 pages.
Notice of Allowance dated Jan. 26, 2017, issued in connection with U.S. Appl. No. 14/495,706, filed Sep. 24, 2014, 8 pages.
Notice of Allowance dated Dec. 27, 2017, issued in connection with U.S. Appl. No. 14/495,659, filed Sep. 24, 2014, 6 pages.
Notice of Allowance dated Dec. 29, 2016, issued in connection with U.S. Appl. No. 14/197,403, filed Mar. 5, 2014, 5 pages.
Notice of Allowance dated Aug. 30, 2018, issued in connection with U.S. Appl. No. 14/821,513, filed Aug. 7, 2015, 10 pages.
Notice of Allowance dated May 31, 2017, issued in connection with U.S. Appl. No. 14/495,684, filed Sep. 24, 2014, 5 pages.
Notice of Allowance dated May 4, 2017, issued in connection with U.S. Appl. No. 14/495,595, filed Sep. 24, 2014, 5 pages.
Preinterview First Office Action dated May 4, 2016, issued in connection with U.S. Appl. No. 14/495,659, filed Sep. 24, 2014, 6 pages.
Palm, Inc., "Handbook for the Palm VII Handheld," May 2000, 311 pages.
Park et al., "Group Synchronization in MultiCast Media Communications," Proceedings of the 5th Research on Multicast Technology Workshop, 2003, 5 pages.
Polycom Conference Composer User Guide, copyright 2001, 29 pages.
Pre-Brief Conference Decision dated Sep. 7, 2018, issued in connection with U.S. Appl. No. 14/297,193, filed Jun. 5, 2014, 2 pages.
Preinterview First Office Action dated May 4, 2016, issued in connection with U.S. Appl. No. 14/455,651, filed Aug. 8, 2014, 7 pages.
Advisory Action dated Sep. 11, 2019, issued in connection with U.S. Appl. No. 14/495,633, filed Sep. 24, 2014, 3 pages.
Advisory Action dated Oct. 21, 2019, issued in connection with U.S. Appl. No. 15/664,634, filed Jul. 31, 2017, 4 pages.
Advisory Action dated Nov. 25, 2019, issued in connection with U.S. Appl. No. 15/607,267, filed May 26, 2017, 5 pages.
Advisory Action dated Oct. 25, 2019, issued in connection with U.S. Appl. No. 15/966,337, filed Apr. 30, 2018, 4 pages.
Advisory Action dated May 29, 2020, issued in connection with U.S. Appl. No. 15/595,519, filed May 15, 2017, 2 pages.
Anonymous: "Email Parser Tool—customizable email parsing software by ITG," May 17, 2014, [online] Retrieved from the Internet on Nov. 5, 2019: (URL:https//web.archive.org/web/20140517050139://emailparser.net/).

(56) References Cited

OTHER PUBLICATIONS

European Patent Office, European Office Action dated Nov. 13, 2019, issued in connection with European Application No. 15829058.5, 8 pages.
European Patent Office, Summons to Attend Oral Proceedings dated Jun. 11, 2019, issued in connection with European Application No. 14743335.3, 10 pages.
Final Office Action dated Oct. 2, 2019, issued in connection with U.S. Appl. No. 14/297,193, filed Jun. 5, 2014, 47 pages.
Final Office Action dated Oct. 3, 2019, issued in connection with U.S. Appl. No. 16/174,703, filed Oct. 30, 2018, 17 pages.
Final Office Action dated 11 Feb. 2020, issued in connection with U.S. Appl. No. 15/595,519, filed May 15, 2017, 15 pages.
Final Office Action dated Aug. 20, 2019, issued in connection with U.S. Appl. No. 15/607,267, filed May 26, 2017, 19 pages.
Final Office Action dated Jul. 31, 2019, issued in connection with U.S. Appl. No. 15/664,634, filed Jul. 31, 2017, 16 pages.
Final Office Action dated Jul. 5, 2019, issued in connection with U.S. Appl. No. 14/495,633, filed Sep. 24, 2014, 16 pages.
Final Office Action dated Jul. 5, 2019, issued in connection with U.S. Appl. No. 15/966,337, filed Apr. 30, 2018, 16 pages.
Non-Final Office Action dated May 12, 2020, issued in connection with U.S. Appl. No. 16/516,767, filed Jul. 19, 2019, 12 pages.
Non-Final Office Action dated Mar. 13, 2020, issued in connection with U.S. Appl. No. 15/664,634, filed Jul. 31, 2017, 20 pages.
Non-Final Office Action dated Jan. 14, 2020, issued in connection with U.S. Appl. No. 15/966,337, filed Apr. 30, 2018, 16 pages.
Non-Final Office Action dated Apr. 28, 2020, issued in connection with U.S. Appl. No. 14/297,193, filed Jun. 5, 2014, 34 pages.
Non-Final Office Action dated Jul. 31, 2019, issued in connection with U.S. Appl. No. 15/595,519, filed May 15, 2017, 14 pages.
Notice of Allowance dated Dec. 17, 2019, issued in connection with U.S. Appl. No. 16/174,703, filed Oct. 30, 2018, 11 pages.
Notice of Allowance dated Jan. 17, 2020, issued in connection with U.S. Appl. No. 15/612,126, filed Jun. 2, 2017, 5 pages.
Notice of Allowance dated Dec. 27, 2019, issued in connection with U.S. Appl. No. 14/495,633, filed Sep. 24, 2014, 7 pages.
Notice of Allowance dated Apr. 28, 2020, issued in connection with U.S. Appl. No. 15/612,126, filed Jun. 2, 2017, 5 pages.
Notice of Allowance dated Oct. 30, 2019, issued in connection with U.S. Appl. No. 16/458,453, filed Jul. 1, 2019, 7 pages.
Notice of Allowance dated Aug. 5, 2019, issued in connection with U.S. Appl. No. 15/612,126, filed Jun. 2, 2017, 5 pages.
Yamaha DME Designer 3.0 Owner's Manual; Copyright 2008, 501 pages.

* cited by examiner

SOCIAL PLAYBACK QUEUES

CROSS REFERENCE TO RELATED APPLICATIONS

The present application is a continuation of U.S. application Ser. No. 14/821,513 filed Aug. 7, 2015 which is a continuation of U.S. application Ser. No. 14/455,651 filed Aug. 8, 2014, both of which are incorporated herein by reference in their entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
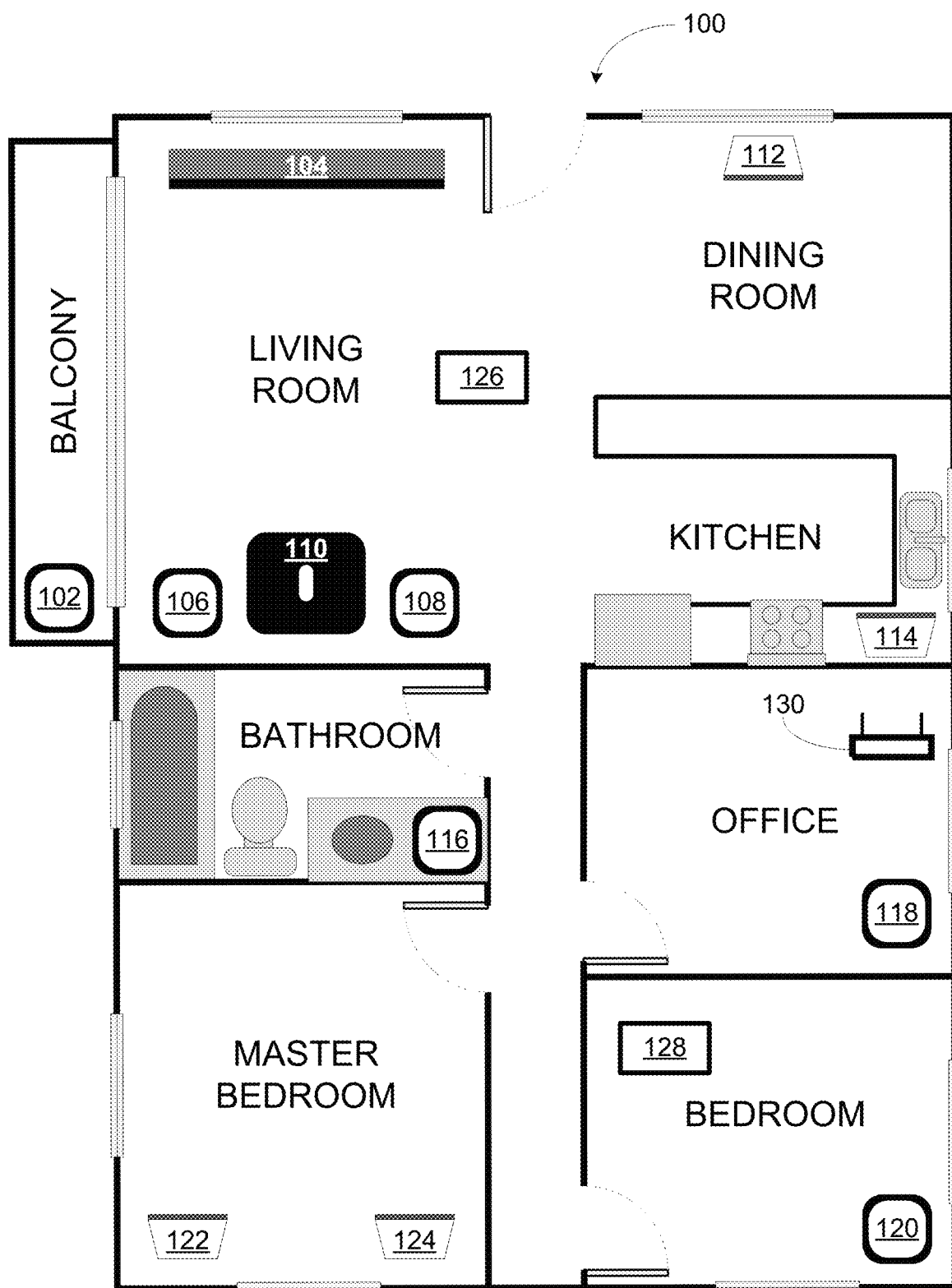
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Examples described herein generally involve updating a playback queue of a media playback system based on communications contained in a communications feed. The communications feed may be capable of receiving communications from multiple sources, any of which may indicate media to be added to the queue. In some implementations, the communications feed may be provided by, or otherwise facilitated by, any suitable service such as Twitter® or Facebook®, among other examples. Further, in some implementations, the media playback system may include multiple playback devices, and the devices may be grouped into one or more zones in which one or more of the playback devices may play media in synchrony. A given zone of the media playback system may be associated with a respective playback queue containing information corresponding to media items for playback by the given zone.

In some previous arrangements, updating a playback queue of a media playback system may involve operations such as accessing a network of the media playback system, selecting the playback queue, and searching a media content source for a media item, among other such functions. However, according to examples described herein, a playback queue may be updated by sending communications to a communications feed. Because the communications feed (e.g., a Twitter® feed) may be able to receive communications from multiple potential sources for updates to the queue (e.g., multiple Twitter® accounts), the playback queue may be referred to as a "social" playback queue.

As indicated above, examples described herein involve updating a playback queue via sending communications to a communications feed. In one aspect, a method is provided. The method involves monitoring, by a computing device, a communications feed for an indication of media; detecting, in the communications feed, the indication of the media; identifying at least one media item corresponding to the indication of the media; and causing a playback queue of a media playback system to include one or more of the identified at least one media item.

In another aspect, a method is provided. The method involves detecting, by a first computing device, indication data that includes a first indication of media; sending the first indication of the media to a second computing device corresponding to a communications feed; detecting, in the communications feed, a second indication of the media, where the second indication includes an indication of at least one media item corresponding to the first indication of the media; detecting, by the first computing device, command data indicating a command to cause a playback queue of a media playback system to include one or more of the identified at least one media item; and sending the indication of the command to the second computing device corresponding to the communications feed.

In yet another aspect, a method is provided. The method involves generating, by a computing device, data that indicates a playback queue of a media playback system, where the data that indicates the playback queue includes (i) an indication of a playback order of one or more media items of the playback queue and (ii) an indication of a communications feed including indications of media in the playback queue; causing storage of first indication data including the data that indicates the playback queue; detecting, in the communications feed, an indication of a command to update the data that indicates the playback queue of the media playback system; based on the detected indication of the command, generating, by the computing device, updated data that indicates the playback queue of the media playback system; and based on the detected indication of the command, causing storage of second indication data including the updated data that indicates the playback queue.

It will be understood by one of ordinary skill in the art that this disclosure includes numerous other embodiments. It will be understood by one of ordinary skill in the art that this disclosure includes numerous other embodiments. While some examples described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
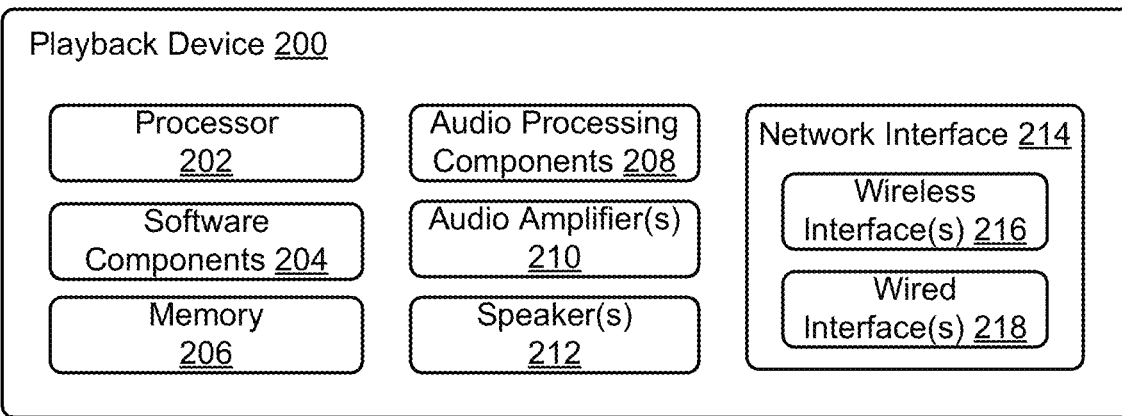
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
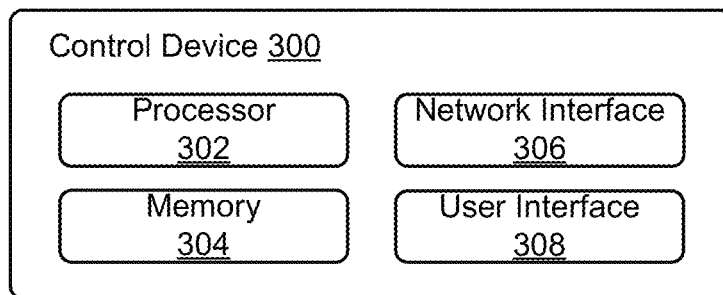
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™ iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
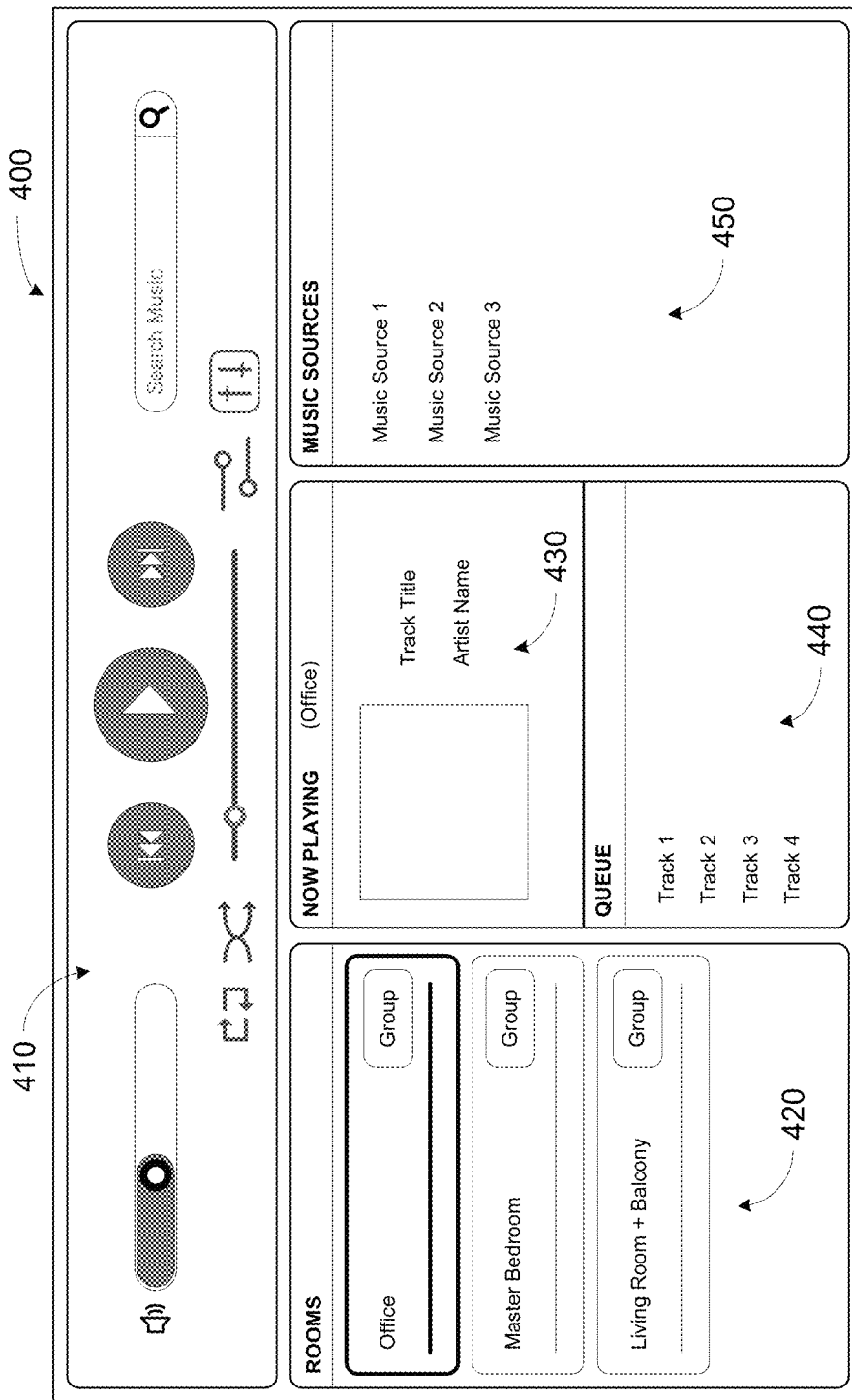
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be re-associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network device, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Methods for Updating a Playback Queue

As discussed above, examples described herein involve updating a playback queue via communications contained in a communications feed. In this section the term "computing device" may have the same meaning as the terms "network device" and/or "controller device" used in previous sections, unless it is clear from context that this is not the case. The term "server" may also be used interchangeably with the term "server device." Terminology such as "server," "server device," "controller," "controller device," "network device," and "computing device" are generally used for explanatory purposes in this disclosure and are not meant to be limiting. One of skill in the art will recognize that any suitable computing device may perform various functions disclosed herein and that the preceding list of terms is non-exhaustive.

Figure 5:
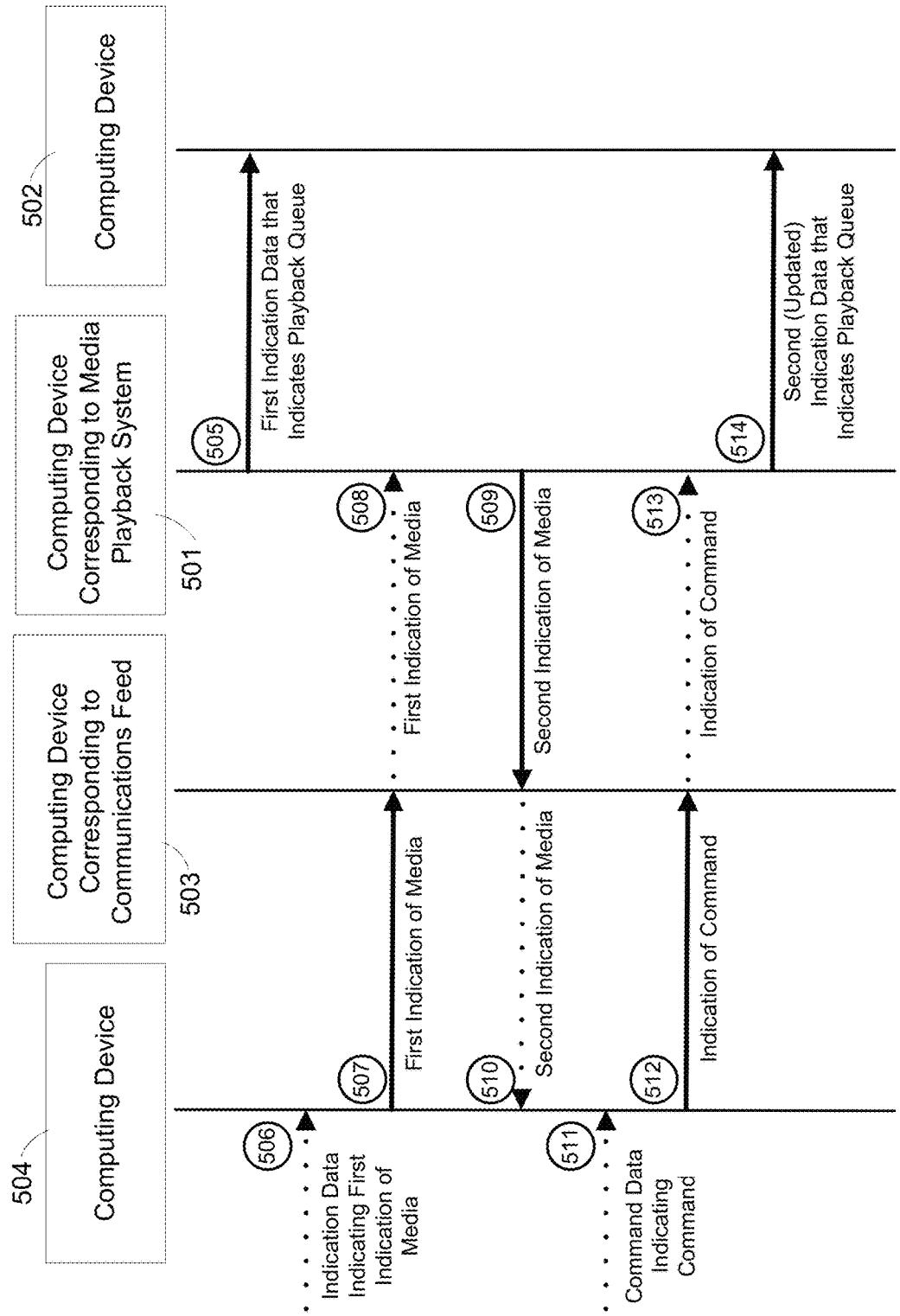
FIG. 5 shows a communications flow diagram in accordance with three example methods.

For purposes of example and explanation, a communications diagram 500 illustrating aspects of example functions is shown in FIG. 5. The example functions shown in FIG. 5 will be further explained below with respect to three example methods. A computing device 501 may correspond to a media playback system and may generate data indicating a playback queue of the media playback system. The computing device 501 may be one or more devices, such as a playback device, a playback device and a controller of the media playback system, among other combinations. The computing device 501 may additionally or alternatively be local or a remote server associated with the media playback system.

The data indicating the playback queue may include a playback order of media items in the queue as well as an indication of a communications feed that is being monitored for updates to the playback queue. The computing device 501 may further cause 505 storage of first indication data indicating the playback queue. For instance, the computing device 501 may cause 505 storage of the first indication data by transmitting the data to a computing device 502. The computing device 502 may be, for example, a controller of the media playback system, which may display the indication of the playback queue on a graphical display. Alternatively or additionally, the computing device 502 may be a local or remote server that may host the indication data such that other computing devices may access the data and display the indication of the playback queue.

A computing device 504 may detect 506 indication data that includes a first indication of media to be added to the playback queue. Computing device 504 may be a controller that is associated with the media playback system, or it may be a control device that is not associated with the media playback system, such as a smartphone. It may also be a laptop computer or tablet computer, among other examples. In FIG. 5, dotted lines represent the detection of indications or data by a given computing device, and may not necessarily represent a communication of the indication or data to the device. The detected indication data may be, for example, a text input to the computing device 504. Further, the first indication of media to be added to the playback queue may include a song name, an artist name, an album name, or any other indication that may indicate the media.

The computing device 504 may then send 507 the first indication of the media to a computing device 503 corresponding to the communications feed. The communications feed may correspond to an address on a social media platform such as Twitter®. The communications feed may also correspond to an email address or a phone number, among other examples. The computing device 503 may be a server or other computing device that maintains or facilitates the communications in the communications feed. Other examples are also possible.

In some examples, the computing device 501 corresponding to the media playback system may be the same computing device as the computing device 503 corresponding to the communications feed. For example, a laptop computer corresponding to the media playback system may, for example, generate data indicating a playback queue and may cause media items to be added to the playback queue. The same laptop computer may further correspond to the communications feed by facilitating the communications feed. For example, the communications feed may be a blog or a message board hosted by the laptop computer.

The computing device 501 may monitor the communications feed for indications of media, and may detect 508 the first indication of the media sent by computing device 504. After detecting 508 the first indication of media in the communications feed, the computing device 501 may identify at least one media item that corresponds to the first indication of the media. The computing device 501 may then send 509 a second indication of the media, including an indication of the identified media item(s), to the computing device 503 corresponding to the communications feed. For instance, the second indication of the media may include a list of media items that were identified by the computing device 501 based on the first indication of the media.

The computing device 504 may detect 510 the second indication of the media in the communications feed. The computing device 504 may additionally, for example, display the second indication, including a list of identified media items, on a graphical display. Next, the computing device 504 may detect command data indicating a command to cause the playback queue to include one or more of the identified media item(s). For example, the command data may be an input to the computing device 504 that selects one of the media items from the indicated list. The computing device 504 may then send 512 the indication of the command to the computing device 503 corresponding to the communications feed.

The computing device 501 may then detect 513 the indication of the command in the communications feed, and may, based on the detected indication of the command, cause the playback queue to include one or more of the identified media item(s). The computing device 501 may additionally generate updated data that indicates the playback queue and then cause 514 storage of updated, second indication data indicating the playback queue. For example, the computing device 504 may transmit 514 the second indication data to the computing device 502 for storage on the computing device 502.

Further described below are example methods. Although functions relevant to the following methods are illustrated in FIG. 5, it should be understood that none of the methods necessarily includes the steps of the others, and that each method may be performed independently of the others. Further, the communications diagram shown in FIG. 5 is illustrated, by way of example, with reference to four computing devices. It should be understood that any of the functions discussed above may be carried out by any of the computing devices shown in FIG. 5, or by any combination of devices. It should also be understood that the following methods may be carried out by any number of computing devices, in any combination. For example, the three methods may be carried out each on a separate computing device, or all three methods may be carried out on a single computing device. Other examples are also possible.

Figure 6:
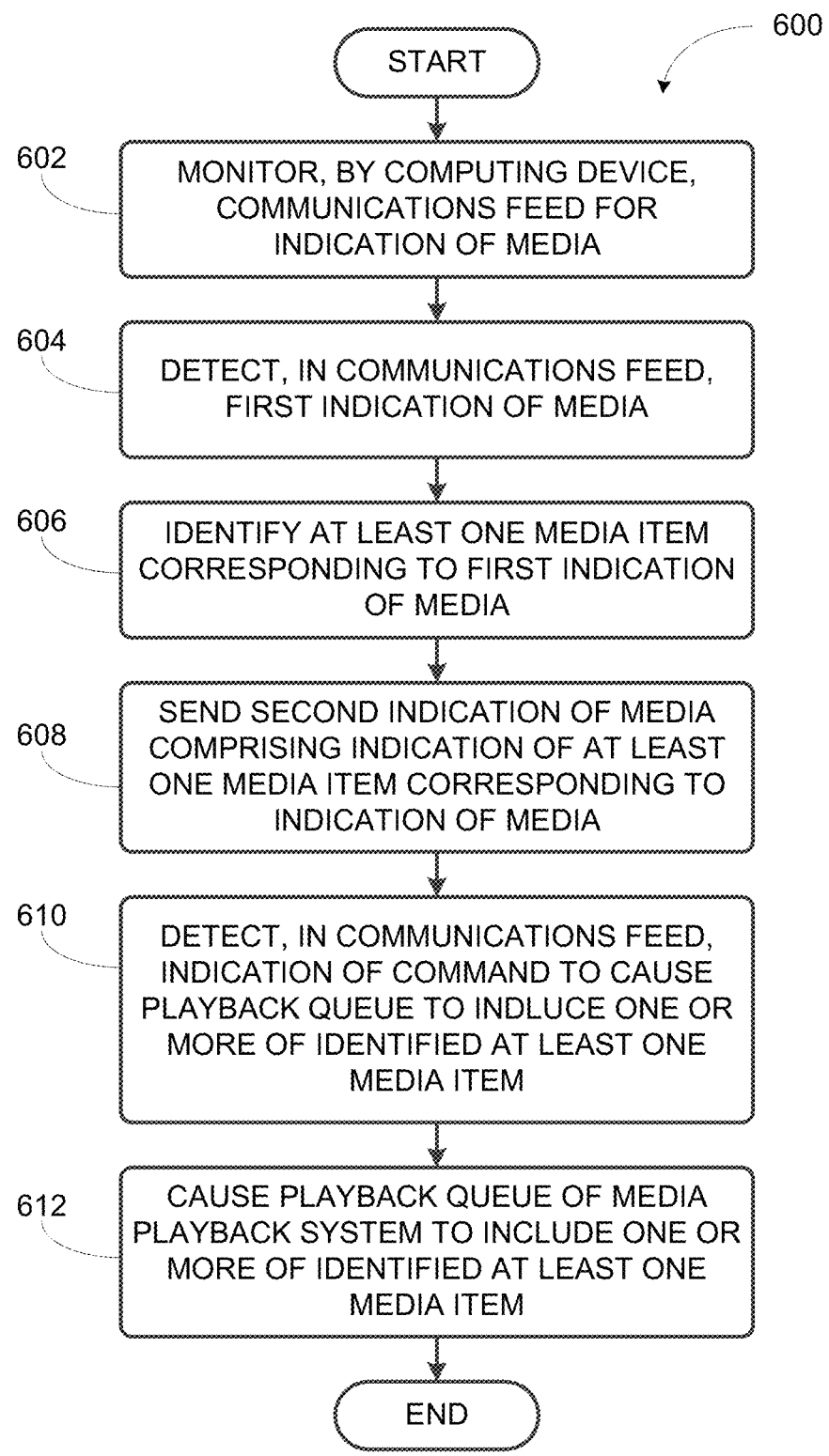
FIG. 6 shows an example flow diagram for an example method to facilitate a social playback queue.
Figure 7:
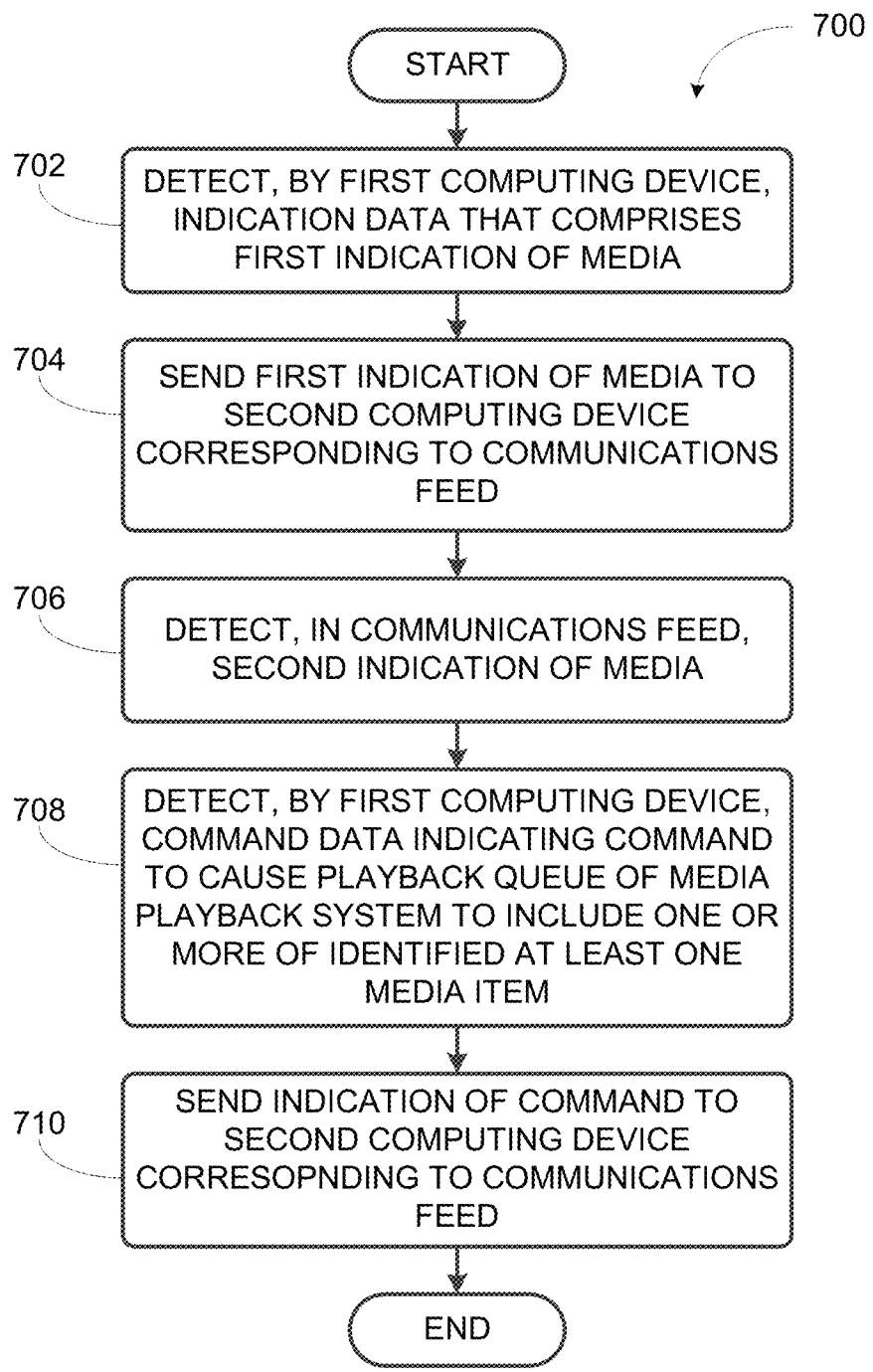
FIG. 7 shows an example flow diagram for another example method to facilitate a social playback queue.
Figure 8:
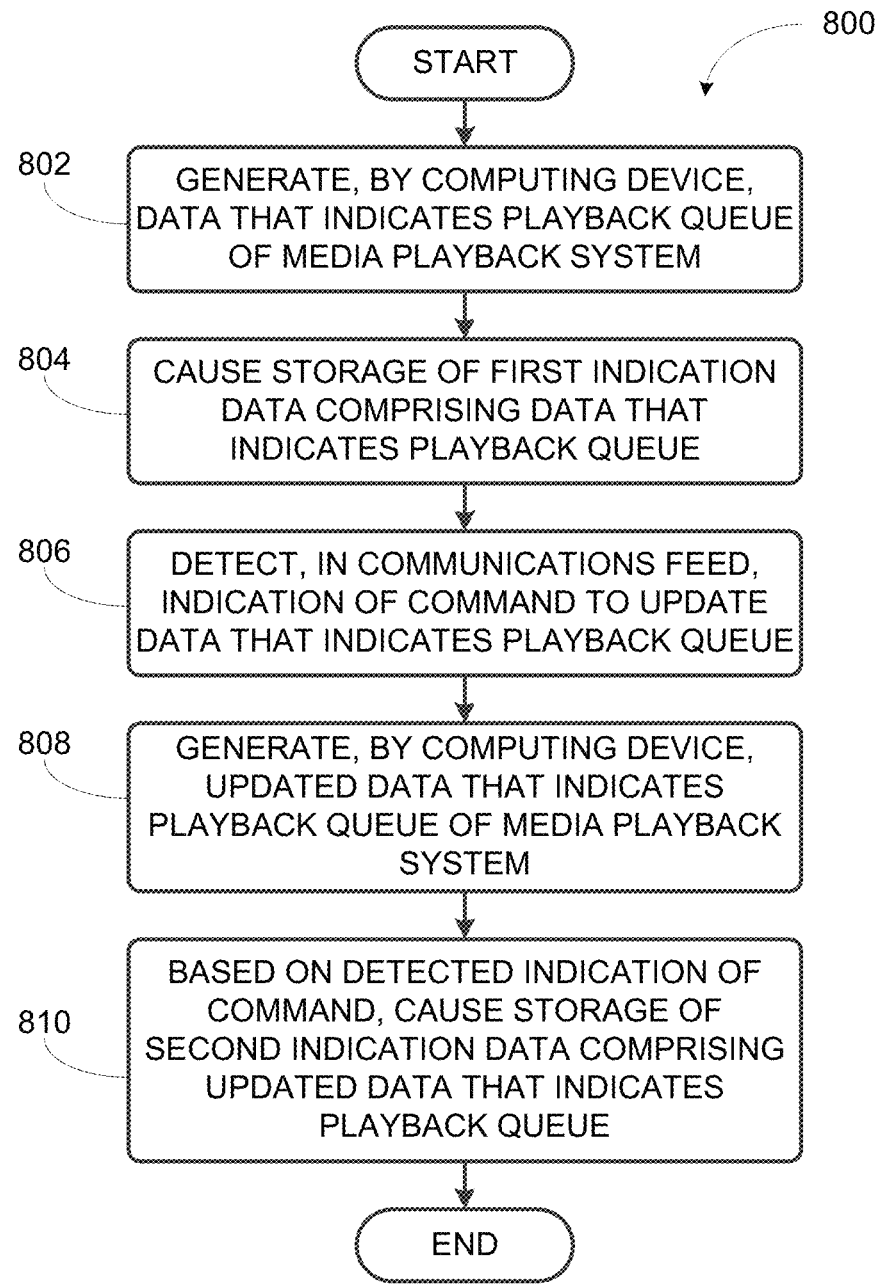
FIG. 8 shows an example flow diagram for another example method to facilitate a social playback queue.

Methods 600, 700, and 800 shown in FIGS. 6, 7, and 8, respectively, present example methods that may be implemented within an operating environment involving, for example, the media playback system 100 of FIG. 1, one or more of the playback device 200 of FIG. 2, and one or more of the control device 300 of FIG. 3. Methods 600, 700, and 800 may include one or more operations, functions, or actions as illustrated by one or more of blocks shown in each Figure. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods 600, 700, and 800 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the methods 600, 700, and 800 and other processes and methods disclosed herein, each block in FIGS. 6, 7, and 8 may represent circuitry that is wired to perform the specific logical functions in the process.

FIG. 6 shows a flowchart depicting an example method 600 implemented by a computing device. FIG. 7 shows a flowchart depicting another example method 700 implemented by a computing device. And FIG. 8 shows a flowchart depicting another example method 800 implemented by a computing device. Where appropriate, the blocks shown in FIGS. 6, 7, and 8 will be explained more fully by reference to FIGS. 9A-9E. FIGS. 9A-9E generally illustrate an example graphical display indicating a playback queue and communications feed at various points in time, from time 1 to time 16. Although the methods 600, 700, and 800 are illustrated in FIGS. 9A-9E as operating in parallel, it should be understood that none of the methods necessarily includes the steps of the others, and that each method may be performed independently of the others.

FIGS. 9A-9E depict examples of data indicating a playback queue of a media playback system, as displayed on a display interface. For example, the indication 900 of the playback queue may include an indication 901 of a playback order of one or more media items of the playback queue. Further, the indication 900 of the playback queue may include indications 902 of each media item that may include a song name, artist name, album name, album art, and a media content source where the media item is located. The indication 900 of the playback queue may also include an indication 903 of a communications feed containing indications 904 of media in the playback queue.

The indication 900 of the playback queue may contain additional indications as well, including an indication 905 of the media item currently playing from the playback queue, and an indication 906 of a zone or zone group currently associated with the playback queue. For instance, in FIGS. 9A-9E, the playback queue may be associated with a zone group that contains a Living Room zone including playback devices 104, 106, 108, and 110 and a Dining Room zone including playback device 112. The indication 900 of the playback queue may further include an indication, for each respective media item in the playback queue, of a history of the respective media item's indications in the communications feed. The history of a given media item's indications may, for instance, be indicated in the communications of the communications feed. Alternatively, as shown in the examples of FIGS. 9A-9E, the indication 907 may be a number representing a quantity, or a net quantity, of indications of the media item.

a. First Example Method to Facilitate Playback Queues

At block 602, a first computing device may monitor a communications feed for an indication of media. The first computing device may be, for example, the computing device 501 shown in FIG. 5. The first computing device may additionally or alternatively be a server, a desktop or laptop computer, or a tablet computer, among other examples.

The communications feed may also take a number of forms. In some examples, the communications feed may correspond to an address on a social media or other communications platform such as Twitter®, Facebook®, Google+Hangouts®, or Skype®, among other examples. The communications feed may be maintained on a server or other computing device and may include all communications directed to, for example, a particular Twitter® address (i.e., the Twitter® feed).

In another embodiment, the communications feed may correspond to an email address. The communications feed may be maintained on an email server and may include all communications directed to the particular email address (i.e., the inbox). In yet another embodiment, the communications feed may correspond to a phone number and may include incoming communications to the phone number, such as SMS, MMS, and voice messages. These may also be maintained on a server or other computing device. Other examples for the communications feed are also possible.

The first computing device may access the communications feed at a regular interval, such as every five or every ten seconds, and may detect communications in the feed. Other examples of how the first computing device may monitor the communications feed, and how frequently it may monitor the communications feed, are also possible.

At block 604, the first computing device may detect the indication of the media in the communications feed. Further, the first computing device may parse the contents of each detected communication in the feed into metadata that may or may not indicate the media. For example, in the example of FIG. 9A, the first computing device may detect in the communications feed the first indication 904, indicating "Song Name 4" at time 1.

In some embodiments, the first computing device may monitor the communications feed for a predetermined syntax. Accordingly, detecting the indication of the media at block 604 may include detecting a communication in the feed having the predetermined syntax. For example, the first computing device may restrict detection to communications in the feed having a special set of characters, such as three periods (i.e., " . . . Song Name 4"), a plus sign (i.e., "+Song Name 4"), a predetermined word or words (e.g., "Add Song Name 4"), or set of numbers (e.g., "233 Song Name 4"), among other examples.

Additionally or alternatively, the predetermined syntax may require indications of media to be presented between one or more parentheses (e.g., "(Song Name 4)", brackets (e.g., "[Song Name 4]"), slashes (e.g., "/Song Name 4/"), or a combination of these. Other examples are also possible.

Figure 9A:
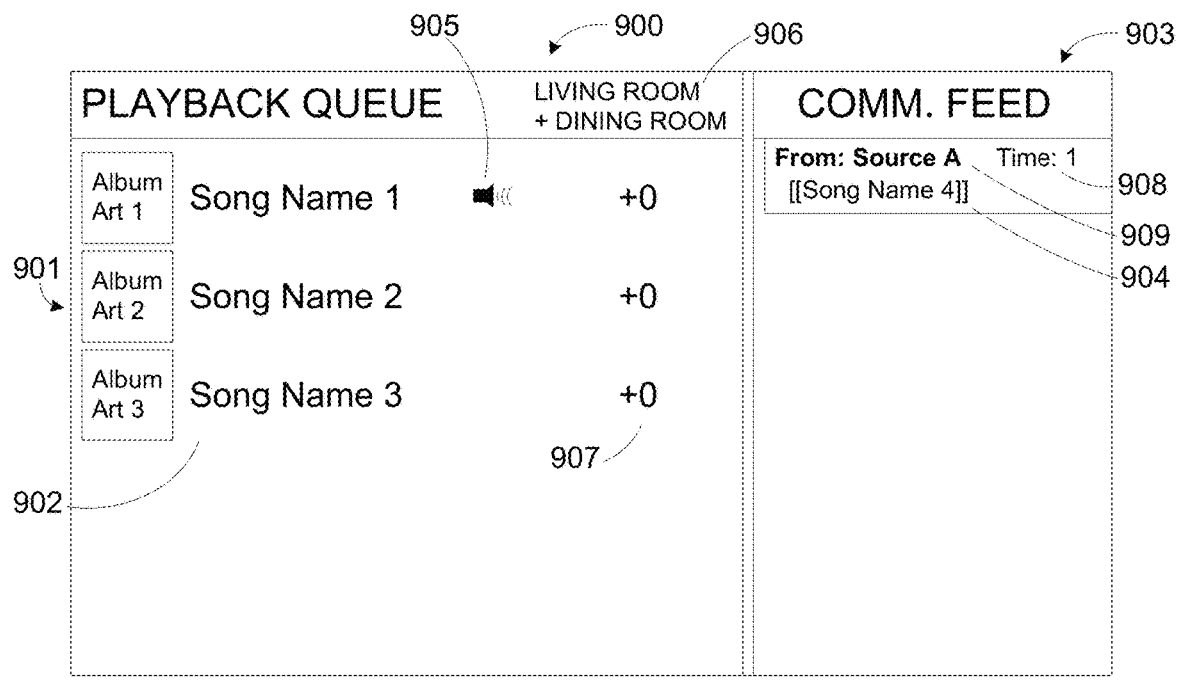
FIG. 9A shows an example display that includes an indication of a playback queue and a communications feed.

In FIG. 9A, the communication at time 1 includes a predetermined syntax where the first indication 904 of Song Name 4 is between double brackets. Additionally or alternatively, the predetermined syntax may include syntax that is not text-based. For example, the predetermined syntax may take the form of other data in the communication, such as a file attached to the communication.

The first computing device may also monitor the communications feed for indications of media from a predetermined set of sources. Thus, detecting the indication of media at block 604 may include detecting a communication in the feed from a source in the predetermined set of sources. For instance, the first computing device may restrict the detection of indications of media to communications in the feed from residents or guests of a household that contains the media playback system. The predetermined set of sources may include a list of contacts in an address book, a set of accounts within a particular domain on a given network, or a group of similarly categorized accounts on a social media platform. As one example, where the communications feed corresponds to a Twitter® address, the predetermined set of sources may be those accounts that follow, or are followed by, the Twitter® address. Other possibilities exist. In FIG. 9A, the communication at time 1 is from Source A, which may be a source in the predetermined set.

Additionally, the first computing device may determine a set of available media content sources. The first computing device may do so either before or after detecting an indication of media in the communications feed at block 604. The set of available media content sources may include any of the example audio content sources noted above. Further, the set of available media content sources may correspond to the media playback system 100. For example, the media playback system 100 may have access to a given set of media content sources established by an owner of the media playback system 100. In some embodiments, a playback device of the media playback system, such as the playback device 200 of FIG. 2, may send to the first computing device an indication of the set of media content sources that it has access to.

After detecting the indication of the media at block 604, the first computing device may identify, at block 606, at least one media item that corresponds to the indication of the media. For example, the first computing device may identify the at least one media item at one of the media content sources from the determined set of media content sources. A media item may include a locator or an identifier that may be used to retrieve the media item from a local or networked media content source. Other examples are possible.

After detecting the indication of the media in the communications feed at block 604 and identifying at least one media item that corresponds to the indication of the media at block 606, the first computing device may, in some cases, cause a playback queue of the media playback system 100 to include one or more of the identified at least one media item, as shown at block 612. For instance, when a single media item is identified at block 606, the first computing device may add the identified media item to the end of the playback queue. When multiple media items are identified, the first computing device may add each of the media items to the playback queue. Alternatively, the first computing device may add only the first identified media item, or some other predetermined number, to the playback queue. Other possibilities also exist.

Alternatively, the first computing device may send, at block 608, a second indication of the media, including an indication of the identified at least one identified media item. The first computing device may send the second indication via an account, such as a Twitter® account or an email account, among other possibilities.

Further, the first computing device may send the second indication to a second computing device that corresponds to the communications feed. The second computing device may be the computing device 503 shown in FIG. 5. Additionally or alternatively, the second computing device may be a server that maintains or facilitates the communications feed, such as a Twitter® or email server. In other examples, the first computing device may send the second indication to a second computing device corresponding to the source of the first indication, which may be the computing device that sent the first indication. The first computing device may also send the second indication to a second computing device corresponding to an owner of the media playback system. The second computing device may receive the indication via an account, such as a Twitter® or email account. Other examples are also possible.

Figure 9B:
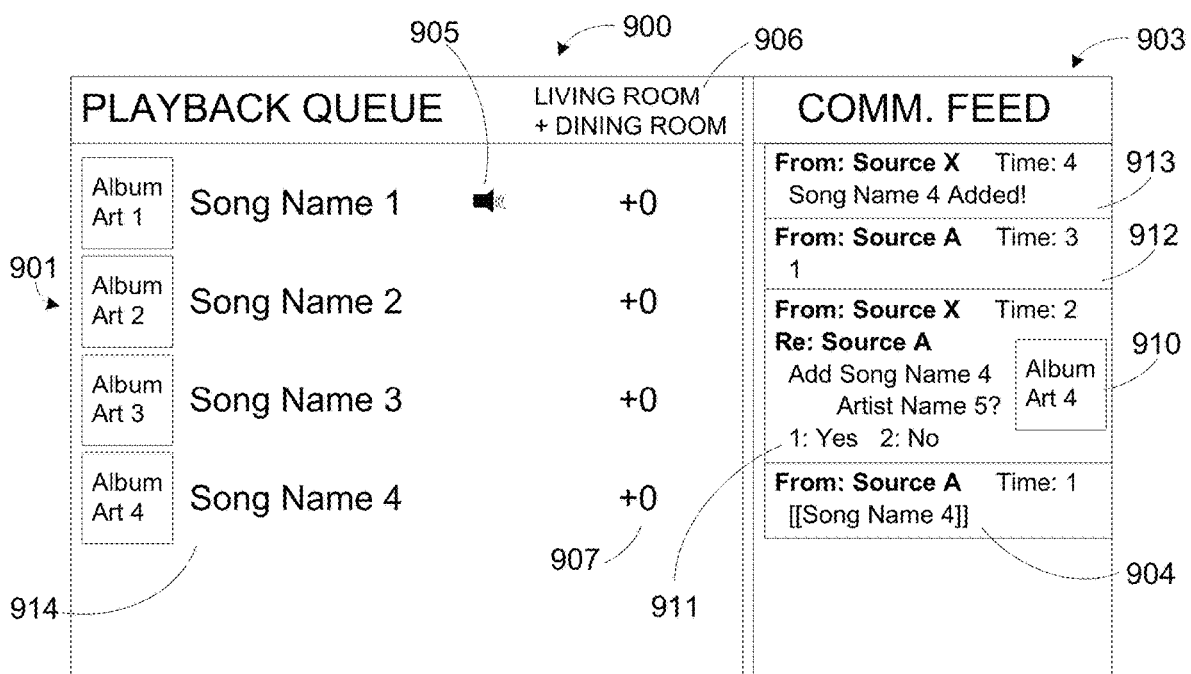
FIG. 9B shows another example display that includes an indication of a playback queue and a communications feed.

For example, after detecting the first indication 904 of Song Name 4 in the communications feed at time 1, the first computing device may, at time 2, send a second indication 910 of Song Name 4 to the communications feed. The example in FIG. 9B shows the indication 900 of the playback queue at time 4, with additional communications displayed in the communications feed, including the second indication 910 at time 2 from the first computing device. The second indication 910 may identify the media item corresponding to the indication 904 of Song Name 4, and in some cases may include additional information identifying the media item. For example, the second indication 910 of Song Name 4 may include an indication of Artist 5 and Album Art 4.

Further, the second indication 910 may include an indication 911 of a potential command, here the number "1", that may cause the playback queue to include the identified media item. For example, a user may input the number "1" via an interface of a control device, representing the command. The sending of the number "1" to the second computing device corresponding to the communications feed may then cause the playback queue to include the identified media item. An indication of another potential command, here the number "2", may also be included that may cause the first computing device to cancel the indication of Song Name 4.

The second indication 910 at time 2 may also include an indication of a source of the second indication, such as Source X as shown in FIG. 9B. For example, the first computing device may send the second indication 910 via an account. Source X may be a pre-existing account that is associated with the first computing device to send communications, such as a Twitter® address, email address, or phone number belonging to the owner of the media playback system 100. Alternatively, the first computing device may send the second indication 910 via a specific account created for the purpose of sending the indications.

In some embodiments, the second indication may also include an indication of a reply to the source of the first indication of the media. For instance, the second indication 910 in FIG. 9B includes an indication "Re: Source A", indicating that the second indication 910 at time 2 is responsive to the first indication 904 at time 1, sent from Source A. The indication of the reply may also take other forms, such as "@Source A" or ">>Source A", among other examples.

At block 610, the first computing device may detect, in the communications feed, an indication of a command to cause the playback queue to include one or more of the identified at least one media item. Based on the detected indication of the command, the first computing device may, at block 612, cause the playback queue to include one or more of the identified at least one media item. For example, the first computing device may detect the indication 912 of the number "1" in the communications feed at time 3, and based on this, add the media item corresponding to the indication 904 of Song Name 4 to the playback queue at time 4. In some cases, the first computing device may also send a third indication 913 of the media to the second computing device corresponding to the communications feed at time 4, acknowledging the addition of the media item to the playback queue.

In some cases, the first computing device may, at block 606, identify more than one media item that may correspond to the indication of the media. For example, the first computing device may search at least one media content source and identify two or more potential media items corresponding to the indication. In some cases, an indication of media might not be specific enough to correspond to a single media item from the media content sources, and the first computing device may identify multiple media items that have, for instance, a similar song name. As another example, some indications of media may indicate a set media items, as in a case where the indication is the name of an artist generally, or the name of an album generally. Here, the first computing device may identify a predetermined number, such as three or four media items, that correspond to the artist or album. The media items in the predetermined number may be identified based on the most played media, a chronological order, or any other criteria. Alternatively, the first computing device may identify all media items that correspond to the indication.

Accordingly, the first computing device sending the second indication at block 608 may include sending a list of two or more of the potential media items that were identified by the first computing device, based on the first indication of the media. As noted above, the second indication may be sent to the second computing device corresponding to the communications feed, the source of the first indication, the owner of the media playback system 100, or a different second computing device.

Figure 9C:
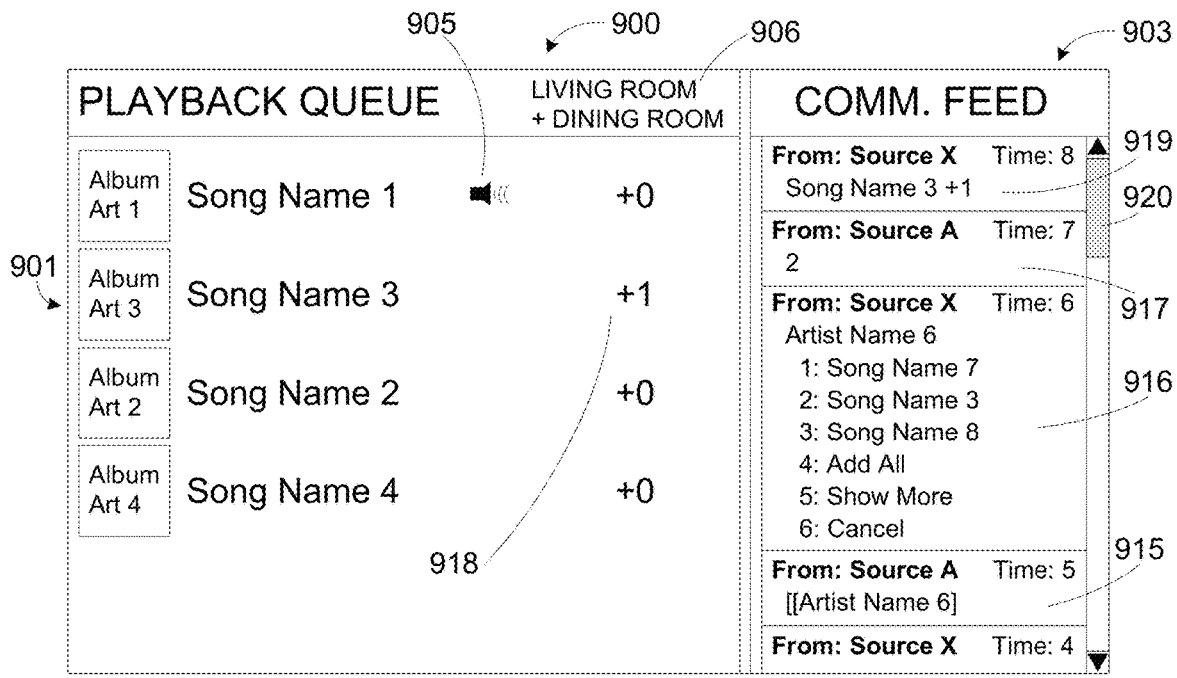
FIG. 9C shows another example display that includes an indication of a playback queue and a communications feed.

For example, FIG. 9C illustrates the indication 900 of the playback queue at time 8, with additional communications displayed in the indication 903 of the communications feed. At time 5, the first computing device may detect a first indication 915 of Artist Name 6. The first computing device may then identify three potential media items corresponding to the indication 915 of Artist Name 6 and send, at time 6, a second indication 916 of Artist 6 including a list of the potential media items to the second computing device corresponding to the communications feed. The list of potential media items may be accompanied by an indication of potential commands (i.e., the numbers "1", "2", and "3") to cause each item to be added to the playback queue. An indication may also be provided for a potential command (i.e., the number "4") to cause all of the potential media items to be added to the playback queue. Indications may also be provided for potential commands (i.e., the numbers "5" and "6") to seek more media items corresponding to Artist Name 6, or to cancel the indication of Artist Name 6.

Accordingly, the first computing device may detect the indication of the command at block 610 that further indicates a selection of one of the media items in the list. In FIG. 9C, an indication 917 of the command to update the playback queue is displayed in the communications feed at time 7. The indication 917 of the number "2" further indicates the selection one of the potential media. Here, the selection indicates Song Name 3, which corresponds to a media item that is currently in the playback queue.

In some examples, the first computing device may monitor the communications feed for an indication of media corresponding to a media item that is currently in the playback queue, and may detect such an indication. Based on the indication of the media corresponding to a media item currently in the playback queue, the first computing device may update the playback queue. For instance, after detecting the indication 917 to update the playback queue to include Song Name 3, the first computing device may, at time 8, adjust the playback order of Song Name 3 in the playback queue by moving it ahead of Song Name 2. Further, indication 900 of the playback queue may display an updated indication 918 of the history for Song Name 3 to show a "+1", indicating that Song Name 3 has been indicated one additional time after it was in the playback queue. The indication 900 of the playback queue may also show an indication 919 in the communications feed, sent by the first computing device at time 8, acknowledging the updating of the playback queue.

In some cases, the number of communications in the communications feed may be too numerous to fit within the displayed indication 903 of the communications feed. In some embodiments, the indication 903 of the communications feed may include a navigation bar, such as the navigation bar 920 shown in FIGS. 9C-9E, which may allow the indication 903 of the communications feed to display additional, prior communications. Other examples are possible that may allow a greater number of communications to be shown in the indication 903 of the communications feed.

In some embodiments, the first computing device may, before or after causing the playback queue to include the media item at block 612, determine a suggested media item that is similar to the media item that is included in the playback queue. For example, the first computing device may determine a suggested media item based on similar musical characteristics between the two media items. The similar characteristic may be a genre of music such as blues or jazz, a date corresponding to the media item, such as a year the media item was authored and released, such as the 1980s, or a playback history of the media items. Other examples are possible. After determining the suggested media item, the first computing device may send an indication of the suggested media item to the second computing device.

Figure 9D:
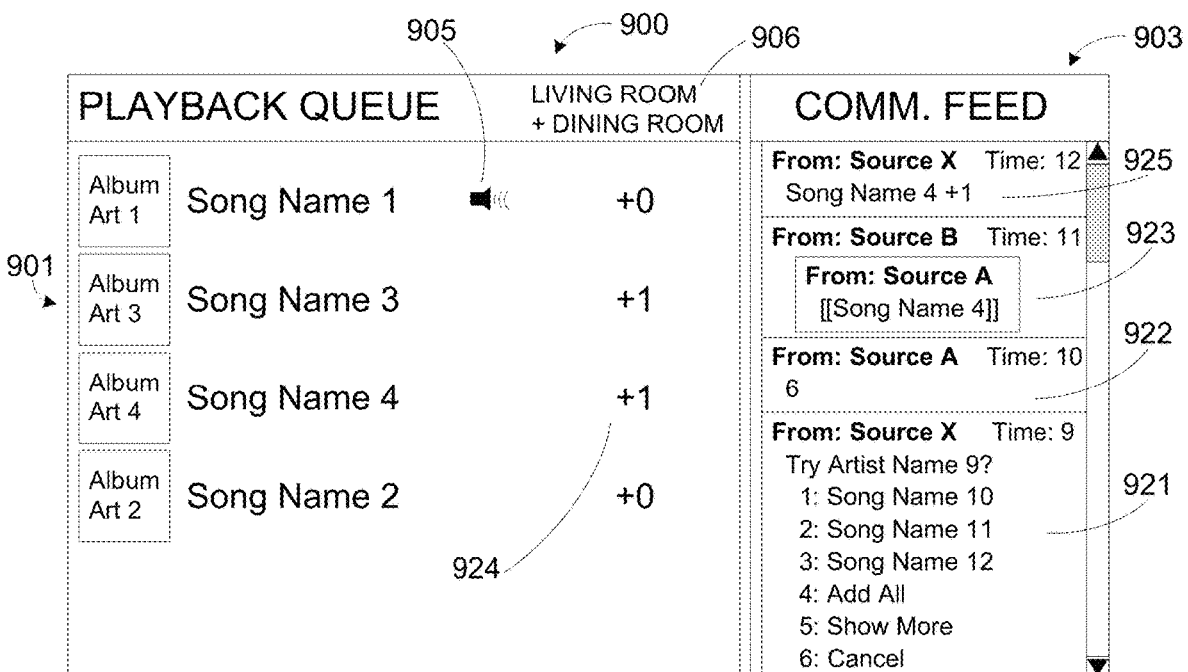
FIG. 9D shows another example display that includes an indication of a playback queue and a communications feed.

Additionally, the first computing device may determine two or more suggested media items, and then send an indication of a list of the suggested media items to the second computing device. FIG. 9D shows the indication 900 of the playback queue at time 12. Based on the addition of Song Name 3 (by Artist 6) to the playback queue at time 8, the first computing device may determine three suggested media items. In this example, the suggested media items are by Artist 8, who may have a similar musical style to Artist 6. At time 9, the first computing device may send an indication 921 of the list of suggested media items to the second computing device corresponding to the communications feed. The indication 921 may then be displayed in the indication 903 of the communications feed. The indication 921 of the list of suggested media items may also include an indication of potential commands (i.e., the numbers "1", "2", and "3") to cause each item to be added to the playback queue. An indication may also be provided for a potential command (i.e., the number "4") to cause all of the potential media items to be added to the playback queue. Indications may also be provided for potential commands (i.e., the numbers "5" and "6") to seek more suggested media items, or to cancel the indication of the suggested media items.

The first computing device may then detect an indication of a selection of one of the suggested media items and a command to include the suggested media item in the playback queue. Alternatively, the first computing device may detect an indication 922 of a command to cancel the indication of the suggested media item, such as the number "6" shown in the communications feed at time 10.

In some cases, a first communication in the communications feed may include an indication of media. The indication may be detected by the first computing device and a corresponding media item may be added to the playback queue. At a later time, the first computing device may detect a second indication of the same media, which corresponds to the media item that is currently in the playback queue. The second indication of the media may be detected in a second communication in the communications feed that refers to the first communication. For instance, the second communication may be a forward of, a reply to, or a reposting of the first communication. Other examples are also possible.

In the example shown in FIG. 9D, the first computing device may detect in the communications feed an indication 923 from Source B, at time 11, that includes a reposting of the indication 904 that was originally detected in the communications feed at time 1. In this example, the first computing device may, based on the indication 923, update the playback queue at time 12 by moving Song Name 4 ahead of Song Name 2 in the playback order. Further, indication 900 of the playback queue may display an indication 924 of an updated history for Song Name 4 to show a "+1". The indication 900 of the playback queue may also show an indication 925 in the communications feed, sent by the first computing device at time 12, acknowledging the updating of the playback queue.

Additionally, in some embodiments the first computing device may detect in the communications feed an indication of media to be removed from or moved to a later position in the order of the playback queue, rather than added or moved to an earlier position. In other words, the first computing device may detect a negative indication of media, rather than a positive indication. For example, the first computing device may detect a negative indication of the media based on predetermined syntax. Numerous examples of such a predetermined syntax may exist, such as a minus sign (i.e., "–Song Name 3"), a set of letters or numbers (e.g., "x Song Name 3") or any other set of characters (e.g., "<<Song Name 3").

Figure 9E:
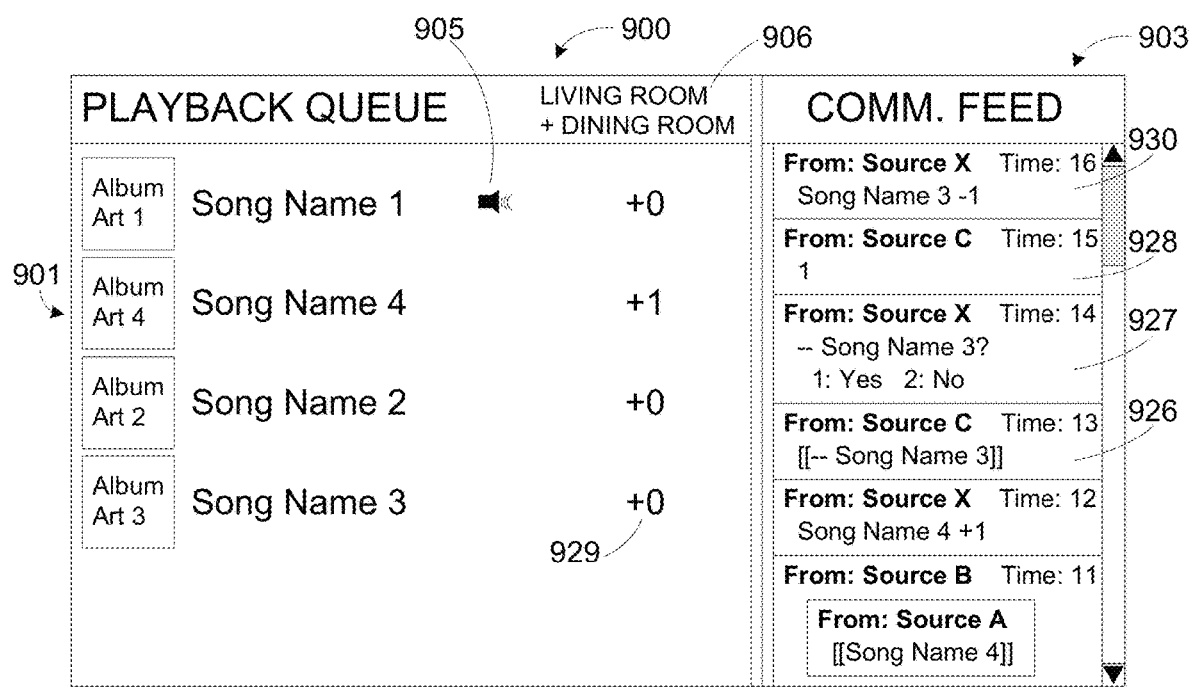
FIG. 9E shows another example display that includes an indication of a playback queue and a communications feed.

FIG. 9E shows an example indication 900 of the playback queue at time 16. The indication 903 of the communications feed shows, at time 13, an indication 926 of Song Name 3 from Source C. The double brackets in the indication 926 may indicate that the communication includes an indication of media, and the double minus sign may indicate that the indication is a negative indication. The first computing device may detect the negative indication 926 of Song Name 3, and may further identify the media item in the playback queue that corresponds to the negative indication 926. The first computing device may then send a further indication 927 of Song Name 3 to the second computing device corresponding to the communications feed, at time 14, along with indications of commands to either update the playback queue (i.e., the number "1") based on the negative indication or cancel the negative indication (i.e., the number "2").

At time 15, the first computing device may detect an indication 928 of the command to update the playback queue, as shown in FIG. 9E. The first computing device may then, at time 16, update the playback queue by moving Song Name 3 to a later position behind both Song Name 4 and Song Name 2 in the playback order. The indication 900 of the playback queue may also display an indication 929 of an updated history for Song Name 3 to show a "+0". The indication 900 of the playback queue may also show an indication 930 in the communications feed, sent by the first computing device at time 16, acknowledging the updating of the playback queue.

In some cases, the communications feed may be an existing communications feed, and the first computing device may associate the existing communications feed with the media playback system 100. In other examples, the first computing device, or another computing device, may create a new communications feed for association with the media playback system 100. The association of the communications feed might not specify a particular playback queue in the media playback system 100. In these cases, the first computing device may, based on indications of media detected in the communications feed, update a default playback queue, which may include causing the default playback queue to be created.

In other examples, the first computing device may associate the communications feed with a playback queue in the media playback system 100. However, the playback queue might not be associated with a playback device 200 in the media playback system 100. For instance, the playback queue might not be assigned to a playback zone or zone group. Alternatively, the communications feed may be associated with a playback queue that is associated with at least one playback device 200 in the media playback system 100. For instance, in the example shown in FIGS. 9A-9E, the communications feed is associated with a playback queue that is assigned to the playback devices in the zone group including the Living Room and Dining Room zones.

Further, the association of the communications feed to the media playback system 100 may be only temporary. For instance, after associating the communications feed with the media playback system 100, the first computing device may terminate the association after a predetermined period of time. The predetermined period of time may be, for instance, several hours, one day, or one week. Other examples are possible.

b. Second Example Method to Facilitate Playback Queues

At block 702 of method 700, a first computing device may detect indication data that includes a first indication of media to be added to the playback queue. The first computing device may be, for example, the computing device 504 shown in FIG. 5. Additionally or alternatively, the first computing device may be a laptop computer, tablet computer, smartphone, or a dedicated controller of a media playback system, such as the media playback system 100 shown in FIG. 1. Other possibilities also exist. With respect to the examples in FIG. 5, the first computing device of method 700 is depicted as being distinct from the first computing device of method 600. However, they may, in some instances, be the same computing device.

The detected first indication data in block 702 may be input data, such as a text input from a keyboard or an audio input (e.g., a voice command) via a microphone. In the example shown in FIGS. 9A-9B, the indication data is a text input and the indication of the media is a song name (Song Name 4). In other examples, the indication data might not take the form of an input. For instance, the first computing device may detect indication data located on internal memory, such as data indicating a most frequently played media item on the first computing device, or a history of recently played media items. The first indication of the media may include a song name, an artist name, an album name, a combination of these, or any other indication that may indicate the media.

At block 704, the first computing device may send the first indication of the media to a second computing device corresponding to a communications feed. The communications feed may be any of the examples noted above, among other examples. The first computing device may send the second indication via an account, such as a Twitter® account or an email account, among other possibilities. The second computing device may be the computing device 503 shown in FIG. 5. Additionally or alternatively, the second computing device may be a server that maintains or facilitates the communications feed, such as a Twitter® or email server. Further, the second computing device may receive the indication via an account, such as a Twitter® or email account. Other examples are also possible.

Returning to FIG. 9A, the indication 900 of the playback queue may display, at time 1, the indication 903 of the communications feed after the smartphone sends the first indication of the media at block 704. Accordingly, the indication 903 of the communications feed may display the first indication 904 of media, Song Name 4, that was sent to the second computing device corresponding to the communications feed. The indication 903 of the communications feed may display other indications as well for a given indication of media, such as a timestamp 908 and an indication 909 of a source of the first indication 904 of media. In the example in FIG. 9A, the first indication 904 of Song Name 4 was sent from Source A, which may indicate a Twitter® account or an email address associated with the first computing device.

At block 706, the first computing device may detect, in the communications feed, a second indication of the media, where the second indication includes an indication of at least one media item corresponding to the first indication of media. In some examples, the first computing device may detect the second indication 910 by accessing the communications feed, such as a Twitter® feed. In another example, the first computing device may detect the second indication 910 in the indication 903 of the communications feed that is displayed on a graphical display of the first computing device as part of the indication 900 of the playback queue, as shown in FIG. 9B at time 2. Other possibilities exist.

At block 708, the first computing device may detect command data indicating a command to cause the playback queue of the media playback system 100 to include one or more of the identified at least one media item. The command data may be, for instance, an input to the first computing device that corresponds to a potential command (i.e., the number "1") that was indicated in the second indication 910 of the media. Alternatively, the first computing device may include programming to automatically generate command data indicating the command based on detecting the second indication 910 of the media.

After detecting the command data indicating the command at block 708, the first computing device may, at block 710, send the indication of the command to the second computing device corresponding to the communications feed. For example, the first computing device may send the indication 912 of the number "1" to the second computing device corresponding to the communications feed. The indication 912 may then be displayed, at time 3, in the indication 903 of the communications feed, as shown in FIG. 9B.

In some embodiments, the first computing device may detect at block 706 a second indication that includes a list of at least two potential media items corresponding to the indication of the media. The example shown in FIG. 9C depicts the indication 900 of the playback queue at time 8. In the indication 903 of the communications feed at time 5, the first indication 915 of the media "Artist Name 6", from Source A, is shown.

The first computing device may then detect, at time 6, a second indication 916 of Artist 6 including a list of potential media items. The list may be accompanied by an indication of potential commands (i.e., the numbers "1", "2", and "3") to cause each item to be added to the playback queue. An indication may also be provided for a potential command (i.e., the number "4") to cause all of the potential media items to be added to the playback queue. Indications may also be provided for potential commands (i.e., the numbers "5" and "6") to seek more media items corresponding to Artist Name 6, or to cancel the indication of Artist Name 6. Other possibilities exist.

At block 708, the first computing device may detect command data that indicates i) a selection of at least one of the potential media items as the at least one media item and ii) a command to cause the playback queue to include the media item. For example, the first computing device may detect an input of the number "2", indicating the selection of the second potential media item in the list, "Song Name 3", as well as indicating a command to add "Song Name 3" to the playback queue.

At block 710, the first computing device may send the indication of i) the selection and ii) the command to the second computing device corresponding to the communications feed. In FIG. 9C, an indication 917 of the command to update the playback queue is displayed in the communications feed at time 7. The indication 917 of the number "2" further indicates the selection one of "Song Name 3" from the potential media in the list.

c. Third Example Method to Facilitate Playback Queues

At block 802 of the method 800, a first computing device may generate data indicating a playback queue of a media playback system, such as the media playback system 100 shown in FIG. 1. The first computing device may be, for example, the computing device 501 shown in FIG. 5. Additionally or alternatively, the first computing device may be a playback device such as the playback device 200 shown in FIG. 2, a server, or a combination of one or more playback devices or other computing devices, among other possibilities. With respect to the examples in FIG. 5, the first computing device of method 800 is depicted as being the same computing device as the first computing device of method 600. However, in some embodiments they may be distinct computing devices.

FIGS. 9A-9E illustrate examples of the data indicating the playback queue, as displayed on a display interface. For example, the indication 900 of the playback queue may include an indication 901 of a playback order of one or more media items of the playback queue. The indication 900 of the playback queue may also include an indication 903 of a communications feed containing indications 904 of media in the playback queue. The indication 900 of the playback queue may also include additional information, as discussed above. Other indications are also possible.

At block 804, the first computing device may cause storage of first indication data including the data indicating the playback queue. For example, the first computing device may cause storage of the first indication data on memory of the first computing device. Additionally or alternatively, causing storage of the first indication data may involve transmitting the first indication data to a second computing device for storage on the second computing device. The second computing device may be, for example, the computing device 502 shown in FIG. 5. With respect to FIG. 5, the second computing device is depicted as being distinct from each other computing device. However, the first computing device may transmit the first indication data to any of the computing devices discussed above or shown in example FIG. 5, individually or in combination, for storage on those devices.

The first indication data may be operable to cause a graphical display to display an indication of the data that indicates the playback queue, such as the example indication 900. For instance, the second computing device may be a control device of the media playback system 100, such as the control device 300 shown in FIG. 3. The control device 300 may include control application software for the media playback system 100 and a graphical display that may display the indication 900 of the playback queue. In another example, the second computing device may be a server that hosts an internet protocol (IP) address. The indication 900 of the playback queue may then be displayed on computing devices that access the IP address through a web browser or other means, using an appropriate network communications interface and a graphical display. Other examples are also possible.

In some embodiments, the data indicating the playback queue may be operable to detect inputs when displayed on a graphical display. For example, the indication 900 of the playback queue may also include indications (not shown) of playback controls, such as the selectable icons displayed in the playback control region 410 of FIG. 4.

At block 806, the first computing device may detect, in the communications feed, an indication of a command to update the data that indicates the playback queue of the media playback system. For example, referring to FIG. 9B, the first computing device may detect, in the communications feed at time 3, the indication 912 of the command to update the playback queue by adding Song Name 4.

At block 808, based on the detected indication 912 of the command, the first computing device may generate updated data indicating the playback queue in the media playback system. For instance, the updated data indicating the playback queue may include the addition of the indicated media, Song Name 4, to the end of the playback queue. The updated data may also include additional communications that may be displayed in the indication 903 of the communications feed. Other examples of the updated data are also possible.

At block 810, the first computing device may additionally, based on the detected indication 912 of the command, cause storage of second indication data including the updated data indicating the playback queue. For example, the first computing device may cause storage of the second indication data by transmitting it to the second computing device. The example indication 900 of the playback queue in FIG. 9B is shown at time 4 and includes updated data, such as the indication 914 of the media item corresponding to the indication 904 of Song Name 4 at the end of the playback queue. Further, a third indication 913 of Song Name 4 is shown in the communications feed at time 4.

Causing storage of the updated data indicating the playback queue might not be limited to times when a media item is added to the playback queue. For instance, in an example embodiment, for each communication that is displayed in the communications feed, the first computing device may detect the communications in the communications feed, generate updated data indicating the communications feed, and cause storage of updated data. In this way, the indication 903 of the communications feed in the playback queue may remain current, or relatively current.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, the present application involves updating a playback queue via sending communications to and detecting communications in a communications feed. In one aspect, a method is provided. The method involves monitoring, by a computing device, a communications feed for an indication of media; detecting, in the communications feed, the indication of the media; identifying at least one media item corresponding to the indication of the media; and causing a playback queue of a media playback system to include one or more of the identified at least one media item.

In another aspect, a method is provided. The method involves detecting, by a first computing device, indication data that includes a first indication of media; sending the first indication of the media to a second computing device corresponding to a communications feed; detecting, in the communications feed, a second indication of the media, where the second indication includes an indication of at least one media item corresponding to the first indication of the media; detecting, by the first computing device, command data indicating a command to cause a playback queue of a media playback system to include one or more of the identified at least one media item; and sending the indication of the command to the second computing device corresponding to the communications feed.

In yet another aspect, a method is provided. The method involves generating, by a computing device, data that indicates a playback queue of a media playback system, where the data that indicates the playback queue includes (i) an indication of a playback order of one or more media items of the playback queue and (ii) an indication of a communications feed including indications of media in the playback queue; causing storage of first indication data including the data that indicates the playback queue; detecting, in the communications feed, an indication of a command to update the data that indicates the playback queue of the media playback system; based on the detected indication of the command, generating, by the computing device, updated data that indicates the playback queue of the media playback system; and based on the detected indication of the command, causing storage of second indication data including the updated data that indicates the playback queue.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A method implemented by a first computing device associated with a media playback system, the method comprising:

accessing a communications feed maintained by a second computing device such that communications directed to the communications feed are stored in memory at the second computing device, wherein accessing the communications feed comprises accessing the stored communications;

detecting, in the communications feed, a first communication comprising a first indication of media content, wherein the first communication originated from a source associated with a second user profile of the communications feed;

based on detecting the first communication, sending, via a first user profile of the communications feed that is associated with the media playback system, to the second computing device, a second communication comprising a second indication of the media content and a first indication of a command to update a playback queue of the media playback system;

after sending the second communication, detecting, in the communications feed, a third communication comprising a second indication of the command, wherein the third communication originated from the source associated with the second user profile of the communications feed; and based on detecting the third communication, updating the playback queue of the media playback system according to the command.

2. The method of claim 1, wherein the command to update the playback queue of the media playback system comprises adding a media item corresponding to the indication of the media content to the playback queue.

3. The method of claim 1, wherein the command to update the playback queue of the media playback system comprises removing a media item corresponding to the indication of the media content from the playback queue.

4. The method of claim 1, further comprising:
determining a predetermined time period for accessing the communications feed, wherein accessing the communications feed comprises accessing the communications feed at a regular time interval during the predetermined time period.

5. The method of claim 1, further comprising:
after updating the playback queue of the media playback system according to the command, sending, to the second computing device, a fourth communication comprising an indication that the playback queue of the media playback system was updated.

6. A first computing device associated with a media playback system, the first computing device comprising:
a processor; and
memory having stored thereon instructions executable by the processor to cause the first computing device to perform functions comprising:
accessing a communications feed maintained by a second computing device such that communications directed to the communications feed are stored in memory at the second computing device, wherein accessing the communications feed comprises accessing the stored communications;
detecting, in the communications feed, a first communication comprising a first indication of media content, wherein the first communication originated from a source associated with a second user profile of the communications feed;
based on detecting the first communication, sending, via a first user profile of the communications feed that is associated with the media playback system, to the second computing device, a second communication comprising a second indication of the media content and a first indication of a command to update a playback queue of the media playback system;
after sending the second communication, detecting, in the communications feed, a third communication comprising a second indication of the command wherein the third communication originated from the source associated with the second user profile of the communications feed; and
based on detecting the third communication, updating the playback queue of the media playback system according to the command.

7. The first computing device of claim 6, wherein the command to update the playback queue of the media playback system comprises adding a media item corresponding to the indication of the media content to the playback queue.

8. The first computing device of claim 6, wherein the command to update the playback queue of the media playback system comprises removing a media item corresponding to the indication of the media content from the playback queue.

9. The first computing device of claim 6, wherein the functions further comprise:
   determining a predetermined time period for accessing the communications feed, wherein accessing the communications feed comprises accessing the communications feed at a regular time interval during the predetermined time period.

10. The first computing device of claim 6, wherein the functions further comprise:
   after updating the playback queue of the media playback system according to the command, sending, to the second computing device, a fourth communication comprising an indication that the playback queue of the media playback system was updated.

11. A non-transitory computer-readable medium having stored thereon instructions executable by a first computing device associated with a media playback system to perform functions comprising:
   accessing, a communications feed maintained by a second computing device such that communications directed to the communications feed are stored in memory at the second computing device, wherein accessing the communications feed comprises accessing the stored communications;
   detecting, in the communications feed, a first communication comprising a first indication of media content, wherein the first communication originated from a source associated with a second user profile of the communications feed;
   based on detecting the first communication, sending, via a first user profile of the communications feed that is associated with the media playback system, to the second computing device, a second communication comprising a second indication of the media content and a first indication of a command to update a playback queue of the media playback system;
   after sending the second communication, detecting, in the communications feed, a third communication comprising a second indication of the command wherein the third communication originated from the source associated with the second user profile of the communications feed; and
   based on detecting the third communication, updating the playback queue of the media playback system according to the command.

12. The non-transitory computer-readable medium of claim 11, wherein the command to update the playback queue of the media playback system comprises adding a media item corresponding to the indication of the media content to the playback queue.

13. The non-transitory computer-readable medium of claim 11, wherein the functions further comprise:
   determining a predetermined time period for accessing the communications feed, wherein accessing the communications feed comprises accessing the communications feed at a regular time interval during the predetermined time period.

14. The non-transitory computer-readable medium of claim 11, wherein the functions further comprise:
   after updating the playback queue of the media playback system according to the command, sending, to the second computing device, a fourth communication comprising an indication that the playback queue of the media playback system was updated.

15. The method of claim 1, wherein the first communication comprising the first indication of the media content further comprises an indication of the second user profile of the communications feed.

16. The method of claim 1, wherein updating the playback queue of the media playback system according to the command comprises updating the playback queue stored on the first computing device.

17. The first computing device of claim 6, wherein the first communication comprising the first indication of the media content further comprises an indication of the second user profile of the communications feed.

18. The first computing device of claim 6, wherein updating the playback queue of the media playback system according to the command comprises updating the playback queue stored on the first computing device.

19. The non-transitory computer-readable medium of claim 11, wherein the first communication comprising the first indication of the media content further comprises an indication of the second user profile of the communications feed.

20. The non-transitory computer-readable medium of claim 11, wherein updating the playback queue of the media playback system according to the command comprises updating the playback queue stored on the first computing device.

* * * * *